US012795757B2

(12) United States Patent
Li et al.

(10) Patent No.: US 12,795,757 B2
(45) Date of Patent: Nov. 10, 2026

(54) BLUETOOTH DEVICE PAIRING CONNECTION METHOD, ELECTRONIC DEVICE, BLUETOOTH DEVICE, AND TERMINAL SYSTEM

(71) Applicant: HONOR DEVICE CO., LTD., Shenzhen (CN)

(72) Inventors: Zhe Li, Shenzhen (CN); Xiaorui Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 199 days.

(21) Appl. No.: 18/552,380

(22) PCT Filed: Apr. 27, 2022

(86) PCT No.: PCT/CN2022/089439

§ 371 (c)(1),
(2) Date: Sep. 25, 2023

(87) PCT Pub. No.: WO2023/279814

PCT Pub. Date: Jan. 12, 2023

(65) Prior Publication Data

US 2024/0163941 A1 May 16, 2024

(30) Foreign Application Priority Data

Jul. 7, 2021 (CN) ......................... 202110765609.8

(51) Int. Cl.
*H04W 76/14* (2018.01)
*H04W 4/80* (2018.01)

(52) U.S. Cl.
CPC ............. *H04W 76/14* (2018.02); *H04W 4/80* (2018.02)

(58) Field of Classification Search
CPC ... H04W 48/10; H04W 12/033; H04W 76/14; H04W 4/06; H04W 8/005; H04W 4/50;
(Continued)

(56) References Cited

U.S. PATENT DOCUMENTS 9,609,464 B2 * 3/2017 Knaappila ............... H04W 4/80
10,178,606 B2 1/2019 Ding et al.
(Continued)

FOREIGN PATENT DOCUMENTS

AU 2018443268 A1 5/2021
CN 104469980 A 3/2015
(Continued)

OTHER PUBLICATIONS

Bluetooth Core Specification Working Group, "Bluetooth Core Specification, V5.2," Internet Citation, Dec. 31, 2019, pp. 1-3256.

*Primary Examiner* — Cindy Trandai
(74) *Attorney, Agent, or Firm* — Fish & Richardson P.C.

(57) ABSTRACT

This application provides a Bluetooth device pairing connection method, an electronic device, a Bluetooth device, and a terminal system. According to the Bluetooth device pairing connection method, an indirect transfer function of a first Bluetooth device is used, so that a second Bluetooth device sends a broadcast with a Bluetooth address of the electronic device, where the broadcast meets a filtering condition of scanning performed by the electronic device, to further transfer a Bluetooth address of the second Bluetooth device to the electronic device for pairing. This improves experience of pairing the second Bluetooth device with the electronic device. In addition, according to the Bluetooth device pairing connection method, there is no need for additional information exchange between the first Bluetooth
(Continued)

device and the electronic device, eliminating overheads of a private channel between the first Bluetooth device and the electronic device.

20 Claims, 19 Drawing Sheets

(58) Field of Classification Search
CPC ....... H04W 12/03; H04W 4/80; H04W 12/50; H04W 12/55; H04W 12/69; H04W 76/11; H04L 63/101; H04L 67/51; H04L 63/0853; H04B 5/70; Y02D 30/70
See application file for complete search history.

(56) References Cited

U.S. PATENT DOCUMENTS

| | | | | |
|---|---|---|---|---|
| 10,582,444 | B1* | 3/2020 | Young | H04W 12/33 |
| 10,939,490 | B2 | 3/2021 | Li et al. | |
| 2008/0274696 | A1* | 11/2008 | Bakshi | H04M 1/6066<br>455/41.2 |
| 2011/0319020 | A1* | 12/2011 | Desai | H04W 4/80<br>455/41.2 |
| 2013/0109315 | A1 | 5/2013 | Polo et al. | |
| 2016/0157048 | A1 | 6/2016 | Kerai et al. | |
| 2016/0174021 | A1* | 6/2016 | Lim | H04L 47/6275<br>370/310 |
| 2016/0286340 | A1 | 9/2016 | Zhu | |
| 2017/0041468 | A1* | 2/2017 | Yokoyama | H04M 3/567 |
| 2017/0154522 | A1* | 6/2017 | Lim | G08C 17/02 |
| 2017/0272270 | A1* | 9/2017 | Gu | H04L 12/2838 |
| 2018/0103499 | A1 | 4/2018 | Lee et al. | |
| 2018/0132102 | A1* | 5/2018 | Kwon | H04W 12/041 |
| 2018/0279202 | A1* | 9/2018 | Tenny | H04W 40/22 |
| 2018/0352312 | A1* | 12/2018 | Kwon | H04W 8/005 |
| 2019/0246440 | A1* | 8/2019 | Bae | H04W 8/005 |
| 2020/0007339 | A1 | 1/2020 | Li | |
| 2020/0053831 | A1* | 2/2020 | Park | H04W 4/80 |
| 2020/0178339 | A1* | 6/2020 | Baik | H04W 4/06 |
| 2020/0322788 | A1* | 10/2020 | Batra | H04W 8/24 |
| 2020/0382950 | A1* | 12/2020 | Fornshell | H04W 12/63 |
| 2021/0051458 | A1* | 2/2021 | Cheong | H04W 84/18 |
| 2022/0006852 | A1 | 1/2022 | Zhang et al. | |

FOREIGN PATENT DOCUMENTS

| | | | |
|---|---|---|---|
| CN | 105162497 | A | 12/2015 |
| CN | 106331990 | A | 1/2017 |
| CN | 108174457 | A | 6/2018 |
| CN | 108769972 | A | 11/2018 |
| CN | 110062104 | A | 7/2019 |
| CN | 110636485 | A | 12/2019 |
| CN | 111343622 | A | 6/2020 |
| CN | 112020048 | A | 12/2020 |
| CN | 112233404 | A | 1/2021 |
| CN | 108476060 | B | 2/2021 |
| CN | 113490158 | A | 10/2021 |
| EP | 3148161 | B1 | 7/2019 |
| WO | 2018000156 | A1 | 1/2018 |

* cited by examiner

BLUETOOTH DEVICE PAIRING CONNECTION METHOD, ELECTRONIC DEVICE, BLUETOOTH DEVICE, AND TERMINAL SYSTEM

CROSS-REFERENCE TO RELATED APPLICATIONS

This application is a national stage of International Application No. PCT/CN2022/089439, filed on Apr. 27, 2022, which claims priority to Chinese Patent Application No. 202110765609.8, filed on Jul. 7, 2021. The disclosures of the aforementioned applications are hereby incorporated by reference in their entireties.

TECHNICAL FIELD

This application relates to the field of power electronics technologies, and in particular, to a Bluetooth device pairing connection method, an electronic device, a Bluetooth device, and a terminal system.

BACKGROUND

In an application process of an electronic device such as a tablet computer or a mobile phone, accessories such as a Bluetooth keyboard, a Bluetooth stylus, a Bluetooth mouse, or a Bluetooth headset are usually used. With more types of these accessories, in different application scenarios, different accessories are required for the electronic device, and Bluetooth devices that need to be connected are different. In some scenarios, the electronic device further needs to connect to a plurality of types of Bluetooth devices, for example, in a common scenario in which both a Bluetooth keyboard and a Bluetooth stylus need to be connected.

In a scenario in which the plurality of types of Bluetooth devices need to be connected, if a user needs to perform operations on the electronic device one by one, user experience is significantly degraded.

SUMMARY

This application provides a Bluetooth device pairing connection method, an electronic device, a Bluetooth device, and a terminal system, to prevent a user from performing operations on the electronic device one by one in a scenario in which a plurality of types of Bluetooth devices need to be connected, thereby improving user experience.

To achieve the foregoing objective, the following technical solutions are provided in this application:

A first aspect of this application provides a Bluetooth device pairing connection method. First, a first Bluetooth device obtains a Bluetooth address of an electronic device; then, the electronic device performs scanning with a filtering condition, where the filtering condition is that data segment content of a broadcast includes the Bluetooth address of the electronic device; after a second Bluetooth device establishes a connection to the first Bluetooth device, the first Bluetooth device sends the Bluetooth address of the electronic device to the second Bluetooth device, and then the second Bluetooth device sends a broadcast whose data segment content includes the Bluetooth address of the electronic device; and when scanning and obtaining the broadcast meeting the filtering condition, the electronic device triggers a connection operation between the electronic device and the second Bluetooth device. That is, an indirect transfer function of the first Bluetooth device is used, so that the second Bluetooth device sends the broadcast meeting the filtering condition of the electronic device, to further transfer a Bluetooth address of the second Bluetooth device to the electronic device for pairing. This improves experience of pairing the second Bluetooth device with the electronic device. In addition, according to the Bluetooth device pairing connection method, there is no need for additional information exchange between the first Bluetooth device and the electronic device, eliminating overheads of a private channel between the first Bluetooth device and the electronic device.

Steps performed by the electronic device in the Bluetooth device pairing connection method include: The electronic device establishes a connection to the first Bluetooth device, and sends the Bluetooth address of the electronic device to the first Bluetooth device in a process of establishing the connection; the electronic device performs scanning with a filtering condition; and the electronic device scans and obtains the broadcast meeting the filtering condition, and triggers the connection operation between the electronic device and the second Bluetooth device.

Steps performed by the first Bluetooth device in the Bluetooth device pairing connection method include: The first Bluetooth device establishes a connection to the electronic device, and obtains the Bluetooth address of the electronic device; and the first Bluetooth device establishes the connection to the second Bluetooth device, and sends the Bluetooth address of the electronic device to the second Bluetooth device, so that the second Bluetooth device can generate the broadcast whose data segment content includes the Bluetooth address to further meet the filtering condition of the electronic device, and after obtaining the Bluetooth address of the second Bluetooth device by using the broadcast, the electronic device triggers the connection operation between the electronic device and the second Bluetooth device.

Steps performed by the second Bluetooth device in the Bluetooth device pairing connection method include: The second Bluetooth device establishes the connection to the first Bluetooth device; the second Bluetooth device receives the Bluetooth address of the electronic device sent by the first Bluetooth device; and the second Bluetooth device sends the broadcast, where the data segment content in the broadcast includes the Bluetooth address of the electronic device, which meets the filtering condition of the electronic device, so that after obtaining the Bluetooth address of the second Bluetooth device by using the broadcast, the electronic device triggers the connection operation between the electronic device and the second Bluetooth device.

In a possible implementation, if the first Bluetooth device is a Bluetooth device with classic Bluetooth, the first Bluetooth device directly records a classic Bluetooth address of the currently connected electronic device in a process of establishing the connection or after the connection is established. If the first Bluetooth device is a Bluetooth low energy (Bluetooth Low Energy, BLE) device, the first Bluetooth device records, in a process of establishing the connection, an equivalent address of the electronic device sent by the electronic device. Therefore, the Bluetooth device pairing connection method has better universality, and is applicable to both the first Bluetooth device with classic Bluetooth and the first Bluetooth device with BLE.

In another possible implementation, a specific process in which the electronic device performs scanning may be as follows: A controller built-in service of the electronic device delivers a filter to a Bluetooth chip of the electronic device, so that the Bluetooth chip starts to scan whether each broadcast meets the filtering condition. The controller built-in service refers to an application that runs in the background and is responsible for processing pairing work. Alternatively, the electronic device delivers the filter in the background as soon as the electronic device is turned on, so that the Bluetooth chip determines, by using the filter, whether each broadcast meets the filtering condition, and does not need to wait for a Bluetooth keyboard to connect to the electronic device before delivering the filter. Alternatively, a dedicated application program is used. The filter may be delivered by the application program provided that the application program is enabled, so that the Bluetooth chip determines, by using the filter, whether each broadcast meets the filtering condition.

In another possible implementation, the second Bluetooth device establishes the connection to the first Bluetooth device by using a coil or a near field communication (near field communication, NFC) technology, and transmits the Bluetooth address of the electronic device.

In another possible implementation, that the electronic device scans and obtains the broadcast meeting the filtering condition, and triggers the connection operation between the electronic device and the second Bluetooth device may be specifically: the Bluetooth chip in the electronic device scans the broadcast, and when scanning and obtaining the broadcast including the Bluetooth address of the electronic device, the Bluetooth chip determines that the broadcast meets the filtering condition, and then reports the Bluetooth address of the second Bluetooth device in the broadcast to the controller built-in service in the electronic device, so that the controller built-in service triggers the connection operation between the electronic device and the second Bluetooth device, to complete a pairing connection process between the electronic device and the second Bluetooth device. The connection operation may be specifically directly connecting, or first asking, by popping up a dialog box, a user whether to perform connecting, and then performing connecting after receiving an affirmative reply.

In another possible implementation, if the second Bluetooth device is not operated by the user within a preset time period, or encounters power exhaustion or exceeds a connection distance, the connection between the electronic device and the second Bluetooth device is broken.

In another possible implementation, when the electronic device knows the Bluetooth address of the second Bluetooth device, if the second Bluetooth device sends the broadcast again, the Bluetooth address of the second Bluetooth device included in the broadcast of the second Bluetooth device may enable the electronic device to trigger the connection operation again, further improving user experience.

In another possible implementation, if a plurality of second Bluetooth devices are communicatively connected to each other, other second Bluetooth devices may also learn of the Bluetooth address of the electronic device, and then all may send broadcasts meeting the filtering condition, so that after obtaining Bluetooth addresses in the broadcasts, the electronic device triggers a connection operation between the electronic device and each of the other second Bluetooth devices.

In another possible implementation, if a plurality of electronic devices belong to a same account, one electronic device delivers Bluetooth addresses of other electronic devices to the second Bluetooth device at a single time after accessing the second Bluetooth device. The second Bluetooth device may send corresponding broadcasts one by one based on a preset time and a preset sequence, and each electronic device triggers a connection operation between each electronic device and the second Bluetooth device. If the electronic devices do not belong to a same account, the electronic devices may notify the first electronic device of the Bluetooth addresses of the electronic devices in any communication mode.

A second aspect of the present invention further provides an electronic device, and the electronic device stores a computer program. The computer program can be executed by the electronic device to implement steps implemented by the electronic device in the Bluetooth device pairing connection method described in any paragraph of the first aspect.

A third aspect of the present invention further provides a Bluetooth device, and the Bluetooth device stores a computer program. The computer program can be executed by the Bluetooth device serving as a first Bluetooth device to implement steps implemented by the first Bluetooth device in the Bluetooth device pairing connection method described in any paragraph of the first aspect. The computer program can be executed by the Bluetooth device serving as a second Bluetooth device to implement steps implemented by the second Bluetooth device in the Bluetooth device pairing connection method described in any paragraph of the first aspect.

A fourth aspect of the present invention further provides a terminal system, including: at least one electronic device described in any paragraph of the second aspect and at least two Bluetooth devices described in any paragraph of the third aspect. At least one of the Bluetooth devices serves as a first Bluetooth device, and at least one of the Bluetooth devices serves as a second Bluetooth device.

It should be understood that descriptions of technical features, technical solutions, beneficial effects, or similar expressions in this application do not imply that all features and advantages can be achieved in any single embodiment. On the contrary, it may be understood that descriptions of features or beneficial effects mean that specific technical features, technical solutions or beneficial effects are included in at least one embodiment. Therefore, descriptions of technical features, technical solutions, or beneficial effects in this specification do not necessarily refer to a same embodiment. Further, the technical features, technical solutions, and beneficial effects described in the embodiments may be combined in any appropriate manner. A person skilled in the art should understand that an embodiment may be implemented without one or more specific technical features, technical solutions, or beneficial effects in a specific embodiment. In other embodiments, additional technical features and beneficial effects may be identified in a specific embodiment that does not reflect all embodiments.

BRIEF DESCRIPTION OF DRAWINGS

To describe technical solutions in embodiments of this application or in the conventional technology more clearly, the following briefly describes the accompanying drawings needed for describing embodiments or the conventional technology. Clearly, the accompanying drawings in the following descriptions merely show embodiments of this application, and a person of ordinary skill in the art can still derive other drawings from provided accompanying drawings without creative efforts.

DESCRIPTION OF EMBODIMENTS

Figure 1:
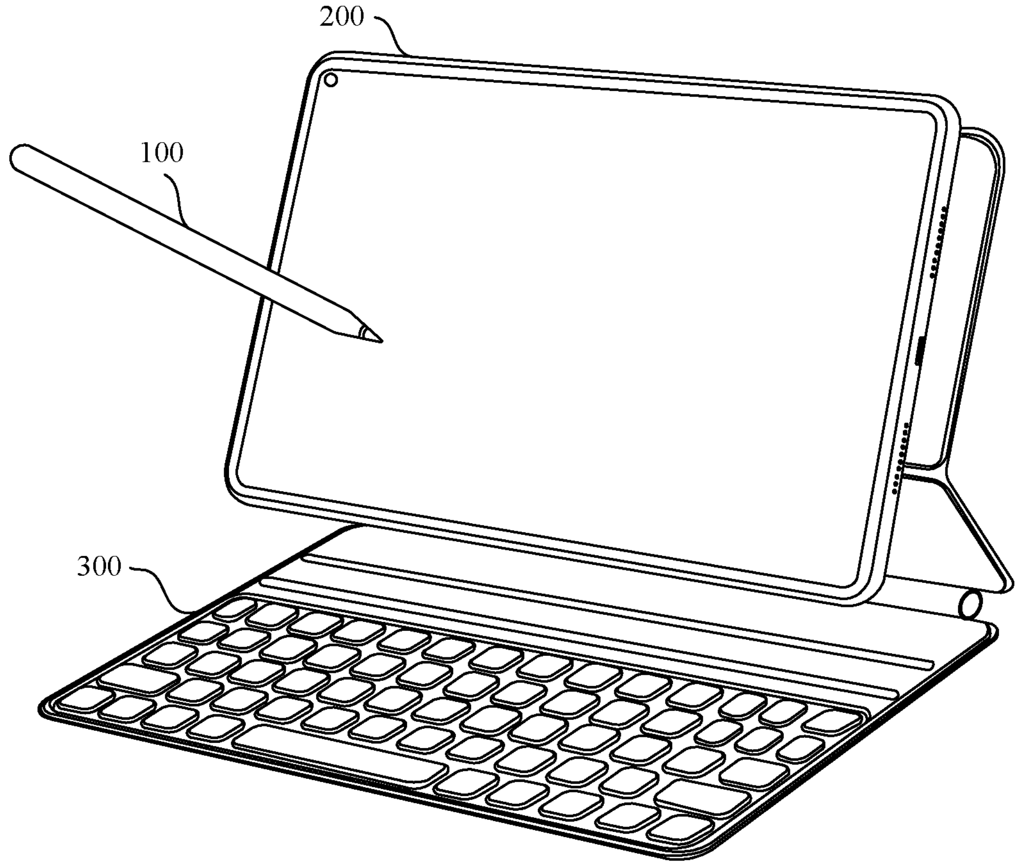
FIG. 1 is a schematic diagram of an application scenario of a terminal system according to the conventional technology.

The terms "first", "second", "third", and the like in the specification, claims, and accompanying drawings of this application are used to distinguish between different objects, but are not used to limit a specific sequence.

In embodiments of this application, words such as "example" or "for example" are used to represent giving examples, illustrations, or descriptions. Any embodiment or design solution described as "example" or "for example" in embodiments of this application should not be construed as being more preferred or advantageous than other embodiments or design solutions. Exactly, use of the words such as "example" or "for example" is intended to present a related concept in a specific manner.

When using an electronic device such as a tablet computer or a mobile phone, a user usually uses a plurality of accessories at the same time. Most commonly, the user uses a Bluetooth stylus and a Bluetooth keyboard at the same time. If the user needs to perform Bluetooth pairing connection operations on the electronic device one by one, a tedious operation process is brought, degrading user experience.

A technical idea is to implement an indirect pairing connection between the electronic device and another Bluetooth device by using an extended function of a Bluetooth device that is used with a specific tablet computer or mobile phone. For example, in a case in which the Bluetooth keyboard is paired and connected to the tablet computer, the Bluetooth stylus may be adsorbed to the Bluetooth keyboard, and the Bluetooth keyboard is used to implement an indirect pairing connection between the tablet computer and the Bluetooth stylus.

A specific execution process of the idea is as follows: The tablet computer and the Bluetooth keyboard are paired and are in a connected state. After the Bluetooth stylus is adsorbed to the Bluetooth keyboard, the Bluetooth stylus sends a Bluetooth address of the Bluetooth stylus to the Bluetooth keyboard by using a coil, and the Bluetooth stylus sends a broadcast. The Bluetooth keyboard sends the Bluetooth address of the Bluetooth stylus to the tablet computer by using a private Bluetooth data channel. The private Bluetooth data channel is another private channel other than a Bluetooth data channel between the tablet computer and a human interface device (Human Interface Device, HID). Then, after receiving the Bluetooth address of the Bluetooth stylus, an application that is in the tablet computer and that processes information from the private channel reports the Bluetooth address of the Bluetooth stylus to an application that is in the tablet computer and that processes pairing. Then, the application triggers a dialog box on an interface for the user to perform connecting, or directly initiates a connection to the Bluetooth stylus, to complete a pairing connection between the Bluetooth stylus and the tablet computer.

In this solution, the pairing connection between the tablet computer and the Bluetooth stylus may be indirectly implemented by adsorbing to the Bluetooth keyboard, to improve pairing experience of the Bluetooth stylus. However, the foregoing private channel needs to be additionally disposed between the Bluetooth keyboard and the tablet computer, and disposition of the private channel needs to be implemented through additional software development, inevitably increasing costs of the private channel and software development.

Therefore, an embodiment of the present invention provides a Bluetooth device pairing connection method, to reduce signaling interaction overheads and improve user experience in a scenario in which a plurality of types of Bluetooth devices need to be connected.

Executors participating in the Bluetooth device pairing connection method include: at least one electronic device, at least one first Bluetooth device, and at least one second Bluetooth device. The electronic device may be a mobile terminal or a fixed terminal with a touch control screen, for example, a tablet computer (portable android device, PAD), a personal digital assistant (personal digital assistant, PDA), a handheld device with a wireless communication function, a computing device, a vehicle-mounted device or a wearable device, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), or a wireless terminal in a smart home (smart home). A form of the terminal device is not specifically limited in this embodiment of this application. The first Bluetooth device may be any device that can trigger a connection to another second Bluetooth device, for example, a Bluetooth keyboard 300 shown in FIG. 1. The second Bluetooth device may be a Bluetooth stylus (for example, 100 shown in FIG. 1), a Bluetooth mouse, a Bluetooth band, or even a Bluetooth headset, all of which fall within the protection scope of this application provided that software is adapted. For example, that the electronic device is a tablet computer 200, the first Bluetooth device is the Bluetooth keyboard 300, and the second Bluetooth device is the Bluetooth stylus 100 is used for presentation in FIG. 1. Actual application is not limited thereto.

Figure 2:
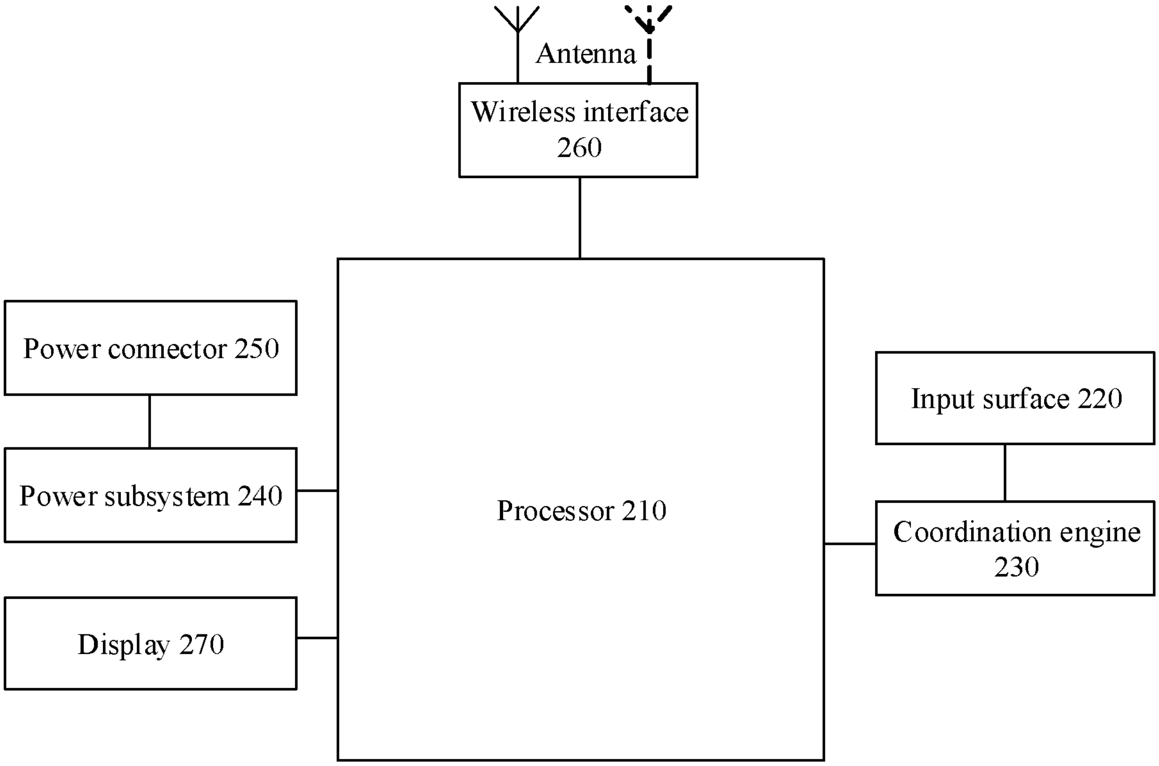
FIG. 2 is a schematic diagram of a module structure of an electronic device according to an embodiment of the present invention.

FIG. 2 is a schematic diagram of a structure of an electronic device according to an embodiment of this application. With reference to FIG. 2, the electronic device may include a plurality of subsystems. These subsystems cooperate to execute, coordinate, or monitor one or more operations or functions of the electronic device. The electronic device includes a processor 210, an input surface 220, a coordination engine 230, a power subsystem 240, a power connector 250, a wireless interface 260, and a display 270.

For example, the coordination engine 230 may be configured to: communicate with another subsystem of the electronic device and/or process data; communicate with and/or exchange data with the Bluetooth stylus 100; measure and/or obtain one or more outputs of one or more analog or digital sensors (for example, touch sensors); measure and/or obtain one or more outputs of one or more sensor nodes in a sensor node array (for example, a capacitive sensing node array); receive and position a tip signal and a ring signal from the Bluetooth stylus 100; position the Bluetooth stylus based on positions of a tip signal crossing area and a ring signal crossing area; and so on.

The coordination engine 230 of the electronic device includes or may be otherwise communicatively coupled to a sensor layer below or integrated with the input surface 220. The coordination engine 230 positions the Bluetooth stylus on the input surface 220 by using the sensor layer and estimates an angular position of the Bluetooth stylus relative to a plane of the input surface 220 by using the technology described in this specification. In an embodiment, the input surface 220 may be referred to as a touch screen. In many cases, the coordination engine 230 may be configured to detect, through capacitive coupling, the tip signal and the ring signal received from the Bluetooth stylus 100 through the sensor layer.

The tip signal and/or the ring signal may include specific information and/or data that may be configured to enable the electronic device to identify the Bluetooth stylus 100. Such information is usually referred to as "stylus identity" information in this specification. The information and/or the data may be received by the sensor layer, and interpreted, decoded, and/or demodulated by the coordination engine 230.

The processor 210 may use the stylus identity information to simultaneously receive an input from more than one Bluetooth stylus 100. Specifically, the coordination engine 230 may be configured to transmit, to the processor 210, a position and/or an angular position of each of several Bluetooth styluses 100 detected by the coordination engine 230. In another case, the coordination engine 230 may further transmit, to the processor 210, information about relative positions and/or relative angular positions of the plurality of Bluetooth styluses 100 detected by the coordination engine 230. For example, the coordination engine 220 may notify the processor 210 of a position of a detected first Bluetooth stylus relative to a detected second Bluetooth stylus.

In another case, the tip signal and/or the ring signal may further include specific information and/or data used to enable the electronic device to identify a specific user. Such information is usually referred to as "user identity" information in this specification.

The coordination engine 230 may forward the user identity information (if the user identity information is detected and/or can be restored) to the processor 210. If the user identity information cannot be restored from the tip signal and/or the ring signal, the coordination engine 230 may optionally indicate to the processor 210 that the user identity information is unavailable. The processor 210 can utilize the user identity information (or absence of such information) in any suitable manner, including but not limited to: accepting or rejecting an input from the specific user, allowing or rejecting access to a specific function of the electronic device, and the like. The processor 210 may use the user identity information to simultaneously receive an input from more than one user.

In another case, the tip signal and/or the ring signal may include specific information and/or data that may be configured to enable the electronic device to identify settings or preferences of the user or the Bluetooth stylus 100. Such information is usually referred to as "stylus settings" information in this specification.

The coordination engine 230 may forward the stylus settings information (if the stylus settings information is detected and/or can be restored) to the processor 210. If the stylus settings information cannot be restored from the tip signal and/or the ring signal, the coordination engine 230 may optionally indicate to the processor 210 that the stylus settings information is unavailable. The electronic device can utilize the stylus settings information (or absence of such information) in any suitable manner, including but not limited to: applying settings to the electronic device, applying settings to a program running on the electronic device, changing a line thickness, a color, or a pattern presented by a graphics program of the electronic device, changing settings of a video game operated on the electronic device, and the like.

Usually, the processor 210 may be configured to: perform, coordinate, and/or manage functions of the electronic device. Such functions may include, but are not limited to, communicating with and/or exchanging data with other subsystems of the electronic device; communicating with and/or exchanging data with the Bluetooth stylus 100; performing data communication and/or data exchange over a wireless interface; performing data communication and/or data exchange over a wired interface; facilitating exchange of power through a wireless (for example, inductive or resonant) or wired interface; receiving a position and an angular position of one or more Bluetooth styluses; and so on.

During use, the processor 210 may be configured to access a memory in which instructions are stored. The instructions may be configured to enable the processor to perform, coordinate, or monitor one or more operations or functions of the electronic device.

The instructions stored in the memory may be configured to control or coordinate operations of other components of the electronic device. The components are, for example but not limited to, another processor, an analog or digital circuit, a volatile or non-volatile memory module, a display, a speaker, a microphone, a rotary input device, a button, or other physical input devices, a biometric authentication sensor and/or system, a force or touch input/output component, a communication module (for example, a wireless interface and/or a power connector), and/or a haptic feedback device.

The memory may further store electronic data that can be used by the Bluetooth stylus 100 or the processor. For example, the memory may store electronic data or content (such as a media file, a document, and an application program), device settings and preferences, a timing signal and a control signal, data, data structures, or databases used for various modules, a file or a configuration related to detection of the tip signal and/or the ring signal, and the like. The memory may be configured as any type of memory. For example, the memory may be implemented as a random access memory, a read-only memory, a flash memory, a removable memory, another type of storage element, or a combination of these devices.

The electronic device further includes the wireless interface 260 to facilitate electronic communication between the electronic device and the first Bluetooth device and/or C. In an implementation solution, the electronic device may be configured to communicate with a corresponding Bluetooth device through a low-energy Bluetooth communication interface or a near field communication interface. In another example, the communication interface facilitates electronic communication between the electronic device and an external communication network, a device, or a platform.

The wireless interface 260 (regardless of a communication interface between the electronic device and the Bluetooth device or another communication interface) may be implemented as one or more wireless interfaces, a Bluetooth interface, a near field communication interface, a magnetic interface, a universal serial bus interface, an inductive interface, a resonant interface, a capacitive coupling interface, a Wi-Fi interface, a TCP/IP interface, a network communication interface, an optical interface, an acoustic interface, or any conventional communication interface.

The electronic device further includes the display 270. The display 270 may be located behind the input surface 220, or may be integrated with the input surface 220. The display 270 may be communicatively coupled to the processor 210. The processor 210 may present information to a user by using the display 270. In many cases, the processor 210 presents, by using the display 270, an interface on which a user can interact with the processor 210. In many cases, the user manipulates the Bluetooth device to interact with the interface.

Figure 3:
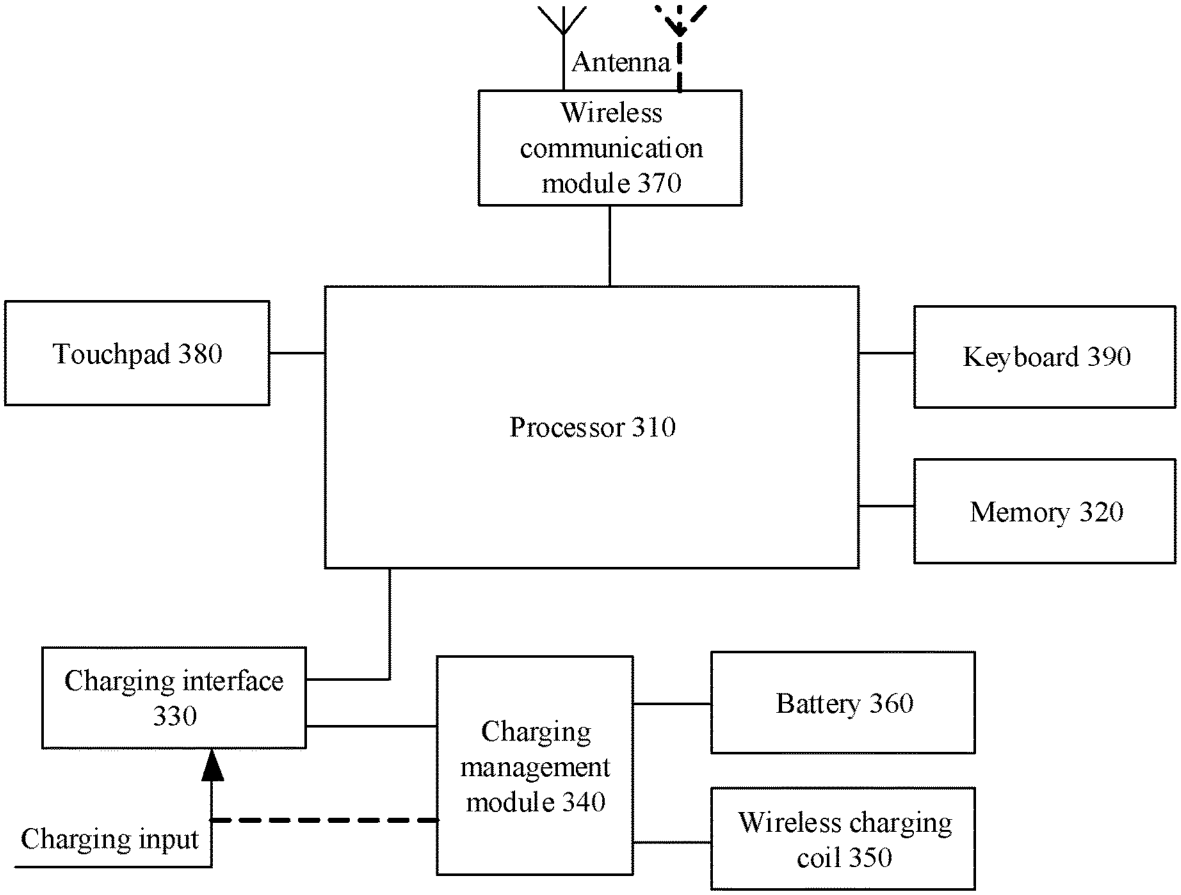
FIG. 3 is a schematic diagram of a module structure of a Bluetooth keyboard according to an embodiment of the present invention.

FIG. 3 is a schematic diagram of a structure of a Bluetooth keyboard 300 according to an embodiment of this application. With reference to FIG. 3, the Bluetooth keyboard 300 may include a processor 310, a memory 320, a charging interface 330, a charging management module 340, a wireless charging coil 350, a battery 360, a wireless communication module 370, a touchpad 380, and a keyboard 390.

The processor 310, the memory 320, the charging interface 330, the charging management module 340, the battery 360, the wireless communication module 370, the touchpad 380, the keyboard 390, and the like may all be disposed on a keyboard body (that is, 302 shown in FIG. 4A) of the Bluetooth keyboard 300. The wireless charging coil 350 may be disposed in a connecting portion (that is, 304 shown in FIG. 4A) for movably connecting the keyboard body to holders.

The memory 320 may be configured to store program code, for example, program code used to wirelessly charge the Bluetooth stylus 100. The memory 320 may further store a Bluetooth address for uniquely identifying the Bluetooth keyboard 300. In addition, the memory 320 may further store connection data of an electronic device that has been successfully paired with the Bluetooth keyboard 300. For example, the connection data may be a Bluetooth address of the electronic device that has been successfully paired with the Bluetooth keyboard 300. Based on the connection data, the Bluetooth keyboard 300 can be automatically paired with the electronic device without configuring a connection between the Bluetooth keyboard 300 and the electronic device, for example, for performing validity verification. The Bluetooth address may be a media access control (media access control, MAC) address.

The processor 310 may be configured to: execute the foregoing application program code, and invoke a related module to implement functions of the Bluetooth keyboard 300 in this embodiment of this application, for example, to implement a wired charging function, a reverse wireless charging function, a wireless communication function, and the like of the Bluetooth keyboard 300. The processor 310 may include one or more processing units, and different processing units may be separate devices or may be integrated into one or more processors 310. The processor 310 may be specifically an integrated control chip, or may include a circuit including various active and/or passive components, and the circuit is configured to perform functions of the processor 310 described in this embodiment of this application. The processor of the Bluetooth keyboard 300 may be a microprocessor.

The wireless communication module 370 may be configured to support data exchange in wireless communication that is between the Bluetooth keyboard 300 and another electronic device and that includes Bluetooth (bluetooth, BT), a global navigation satellite system (global navigation satellite system, GNSS), a wireless local area network (wireless local area networks, WLAN) (for example, a wireless fidelity (wireless fidelity, Wi-Fi) network), frequency modulation (frequency modulation, FM), a near field communication (near field communication, NFC) technology, an infrared (infrared, IR) technology, and the like.

In some embodiments, the wireless communication module 370 may be a Bluetooth module, specifically a Bluetooth chip. The Bluetooth keyboard 300 may, through the Bluetooth chip, be paired with a Bluetooth chip of another electronic device and establish a wireless connection, to implement wireless communication between the Bluetooth keyboard 300 and the another electronic device through the wireless connection.

In addition, the wireless communication module 370 may further include an antenna. The wireless communication module 370 receives an electromagnetic wave through the antenna, performs frequency modulation and filtering processing on an electromagnetic wave signal, and sends a processed signal to the processor 310. The wireless communication module 370 may further receive a to-be-sent signal from the processor 310, perform frequency modulation and amplification on the signal, and convert the signal into an electromagnetic wave for radiation through the antenna.

A touch sensor is integrated into the touchpad 380. A notebook computer may receive a user control command on the notebook computer through the touchpad 380 and the keyboard 390.

Figure 4A:
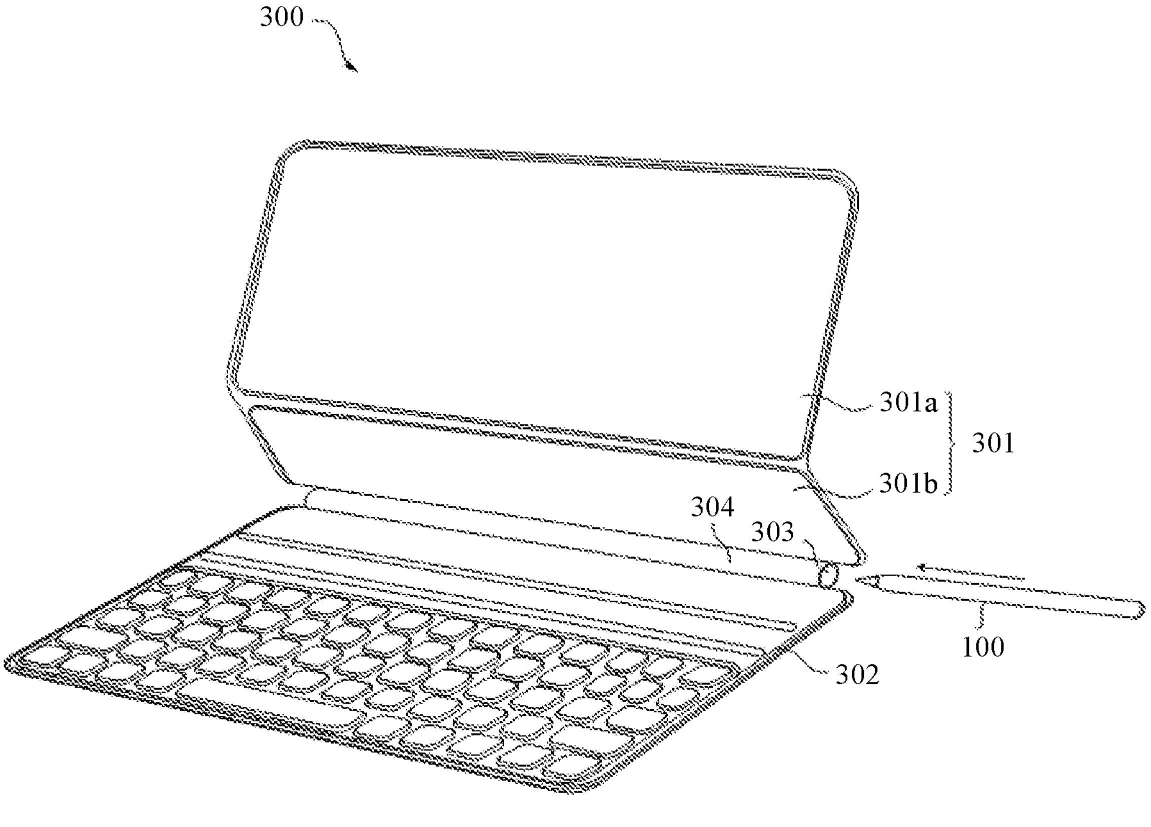
FIG. 4A, FIG. 4B, and FIG. 4C are respectively schematic diagrams of statuses of a terminal system in different use conditions according to an embodiment of the present invention.

In an embodiment, as shown in FIG. 4A, the Bluetooth keyboard 300 may include a first portion 301 and a second portion 302. For example, the Bluetooth keyboard 300 may include a keyboard body and a keyboard cover. The first portion 301 may be the keyboard cover, and the second portion 302 is the keyboard body. The first portion 301 is configured to accommodate the electronic device, and the second portion 302 may be provided with keys, a touchpad, or the like for a user operation.

The first portion 301 may include at least two holders that are rotatably connected to each other, for example, a first holder 301*a* and a second holder 301*b*. The first holder 301*a* and the second holder 301*b* are rotatably connected to each other.

As shown in FIG. 4A, to conveniently accommodate the Bluetooth stylus 100, the Bluetooth keyboard 300 may be provided with an accommodating portion 303 for accommodating the Bluetooth stylus 100. As shown in FIG. 4A, the accommodating portion 303 is a tubular cavity. When being accommodated, the Bluetooth stylus 100 is inserted into the accommodating cavity along an arrow shown in FIG. 4A. In this embodiment, as shown in FIG. 4A, the second portion 302 and the second holder 301*b* are rotatably connected to each other through the connecting portion 304, and the accommodating portion 303 is disposed in the connecting portion 304. The connecting portion 304 may be a rotating shaft.

Figure 4B:
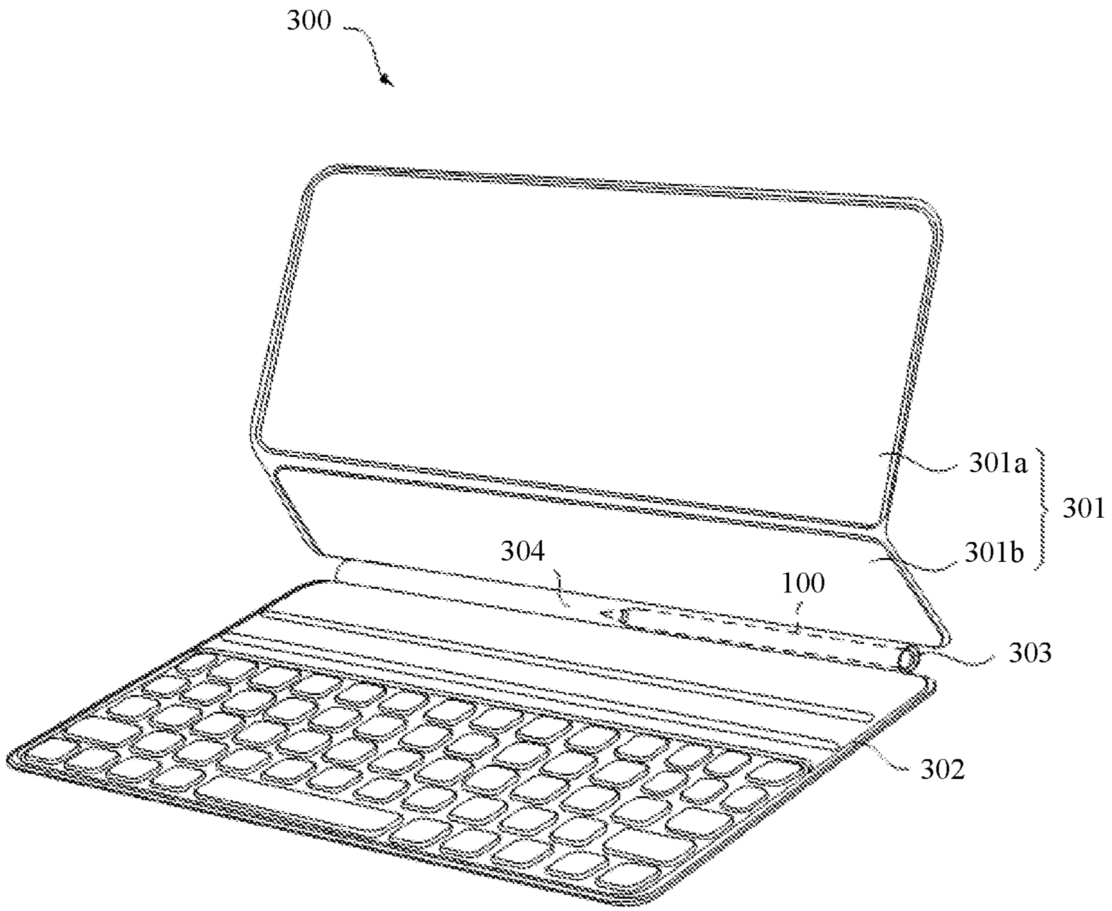
Figure 4C:
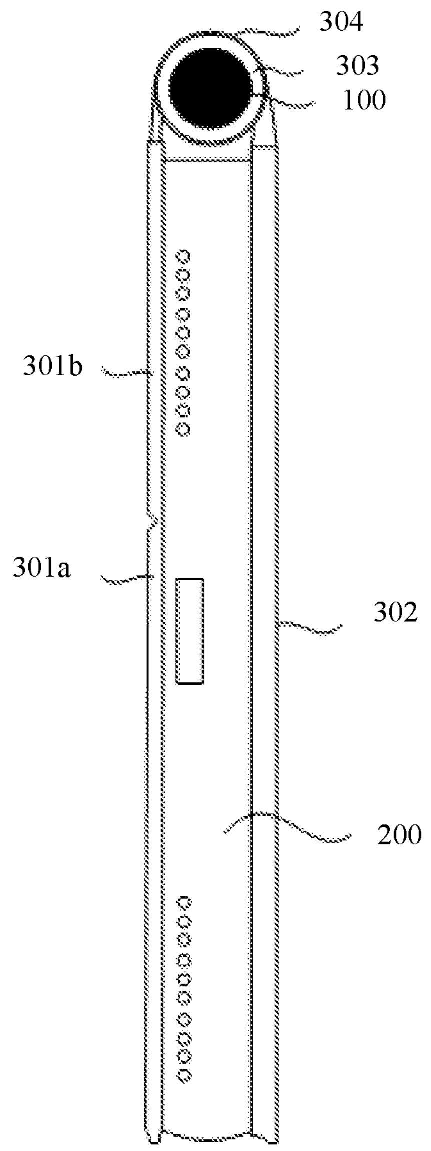

FIG. 4B is a schematic diagram in which a Bluetooth stylus 100 is accommodated in an accommodating portion 303. FIG. 4C is a schematic diagram of a side view obtained when a Bluetooth stylus 100 is accommodated in an accommodating portion 303 of a Bluetooth keyboard 300. Referring to FIG. 4C, the accommodating portion 303 is a circular cavity, and an inner diameter of the accommodating portion 303 is greater than an outer diameter of the Bluetooth stylus 100.

To prevent the Bluetooth stylus 100 from falling when the Bluetooth stylus 100 is placed in the accommodating portion 303, in some examples, the Bluetooth stylus 100 and the accommodating portion 303 are fastened in a manner, including but not limited to magnetic adsorption or clamping.

Figure 5:
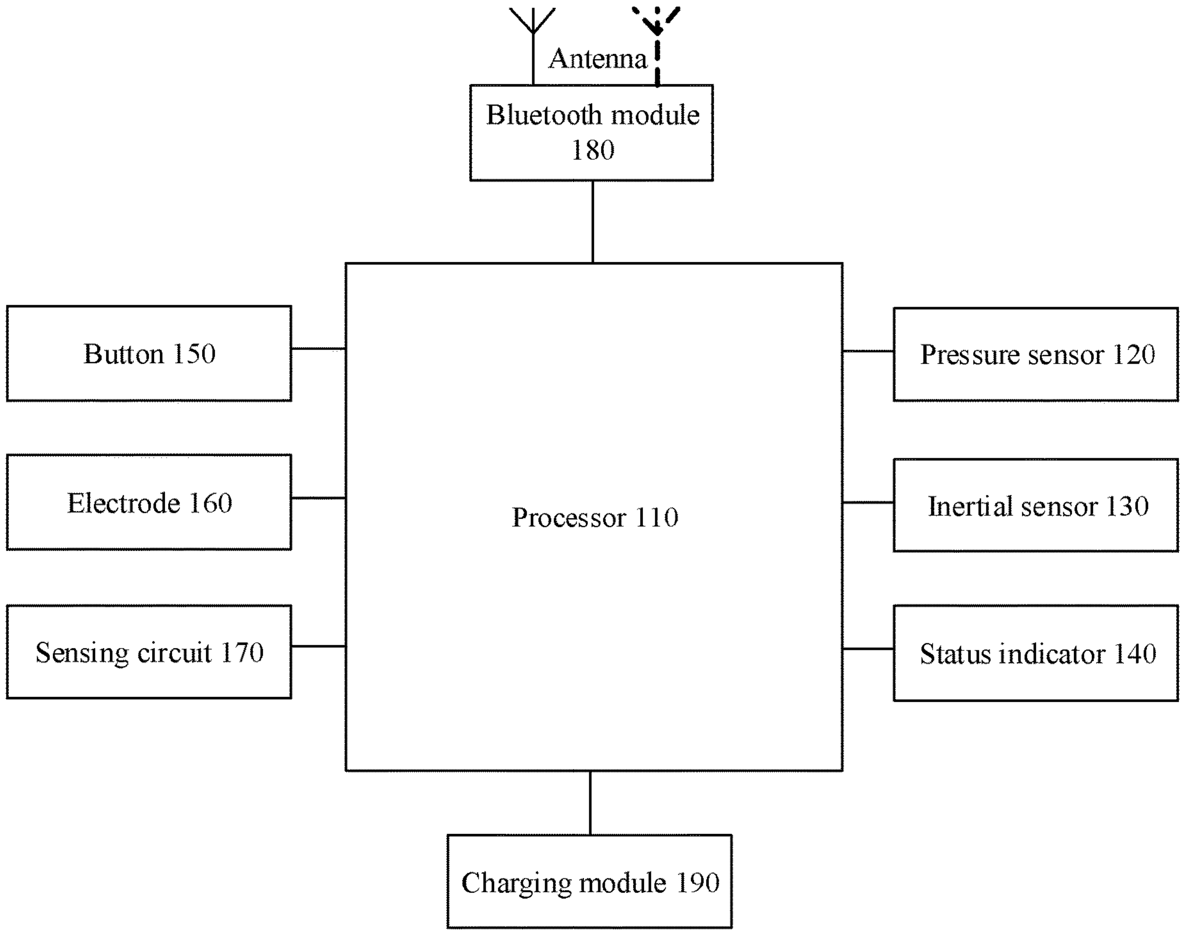
FIG. 5 is a schematic diagram of a module structure of a Bluetooth stylus according to an embodiment of the present invention.

FIG. 5 is a schematic diagram of a structure of a Bluetooth stylus 100 according to an embodiment of this application. Referring to FIG. 5, the Bluetooth stylus 100 may have a processor 110. The processor 110 may include storage and processing circuits configured to support an operation of the Bluetooth stylus 100. The storage and processing circuits may include a storage apparatus (for example, a flash memory or another electrically programmable read-only memory configured as a solid-state drive) such as a non-volatile memory or a volatile memory (for example, a static or dynamic random access memory). A processing circuit in the processor 110 may be configured to control an operation of the Bluetooth stylus 100. The processing circuit may be based on one or more microprocessors, microcontrollers, digital signal processors, baseband processors, power management units, audio chips, application-specific integrated circuits, and the like.

The Bluetooth stylus 100 may include one or more sensors. For example, the sensor may include a pressure sensor 120. The pressure sensor 120 may be disposed at a writing end 11 (as shown in FIG. 6B) of the Bluetooth stylus 100. Certainly, the pressure sensor 120 may be further disposed in a stylus rod 20 of the Bluetooth stylus 100.

The sensor may also include an inertial sensor 130. The inertial sensor 130 may include a tri-axis accelerometer and a tri-axis gyroscope, and/or other components configured to measure movement of the Bluetooth stylus 100. The sensor may also include an additional sensor, such as a temperature sensor, an ambient light sensor, an optical proximity sensor, a contact sensor, a magnetic sensor, a pressure sensor, and/or another sensor.

The Bluetooth stylus 100 may include a status indicator 140 such as a light-emitting diode and a button 150. The status indicator 140 is configured to prompt a user with a status of the Bluetooth stylus 100. The button 150 may include a mechanical button and a non-mechanical button, and the button 150 may be configured to collect button press information from the user.

In this embodiment of this application, the Bluetooth stylus 100 may include one or more electrodes 160 (for details, refer to the following descriptions about FIG. 6B), one electrode 160 may be located at the writing end of the Bluetooth stylus 100, and one electrode 160 may be located in a stylus tip 10.

The Bluetooth stylus 100 may include a sensing circuit 170. The sensing circuit 170 may sense capacitive coupling between the electrode 160 and a drive line of a capacitive touch sensor panel that interacts with the Bluetooth stylus 100.

It can be understood that the Bluetooth stylus 100 may include a microphone, a speaker, an audio generator, a vibrator, a camera, a data port, and another device based on an actual requirement. The user may control, by providing commands through these devices, operations of the Bluetooth stylus 100 and the electronic device with which the Bluetooth stylus 100 interacts, and receive status information and other output.

The processor 110 may be configured to run software on the Bluetooth stylus 100 for controlling the operation of the Bluetooth stylus 100. In an operation process of the Bluetooth stylus 100, the software running on the processor 110 may process a sensor input, a button input, and an input from another apparatus to monitor movement of the Bluetooth stylus 100 and an input of another user. The software running on the processor 110 may detect a user command and may communicate with the electronic device.

To support wireless communication between the Bluetooth stylus 100 and the electronic device, the Bluetooth stylus 100 may include a Bluetooth module 180. The Bluetooth module 180 may include a radio frequency transceiver, for example, a transceiver. The Bluetooth module 180 may also include one or more antennas. The transceiver may transmit and/or receive a wireless signal through the antenna. The wireless signal may be a Bluetooth signal, a wireless local area network signal, a remote signal such as a cellular phone signal, a near field communication signal, or another wireless signal based on a type of a wireless module.

The Bluetooth stylus 100 may further include a charging module 190, and the charging module 190 may support charging of the Bluetooth stylus 100 and provide power for the Bluetooth stylus 100.

Figure 6A:
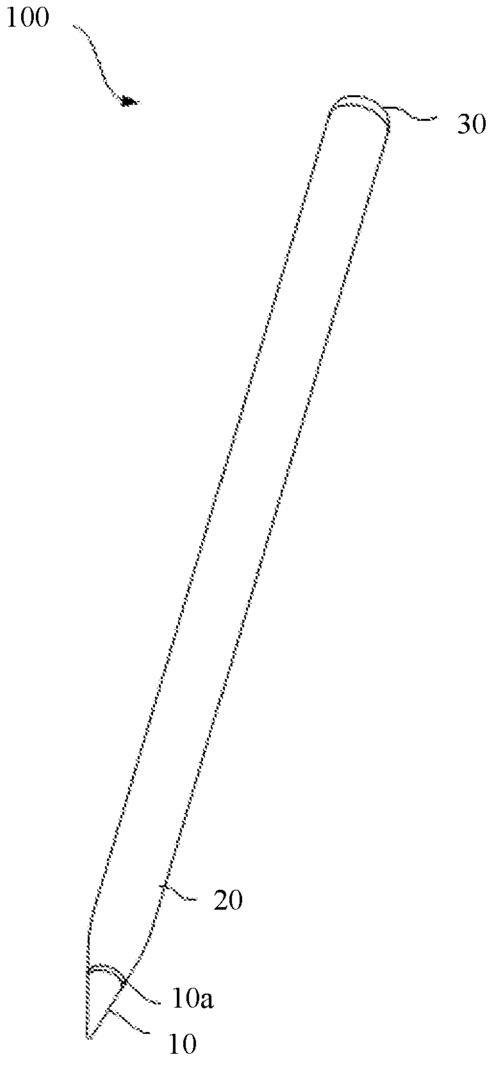
FIG. 6A and FIG. 6B are respectively schematic diagrams of structural composition of a Bluetooth stylus according to an embodiment of the present invention.
Figure 6B:
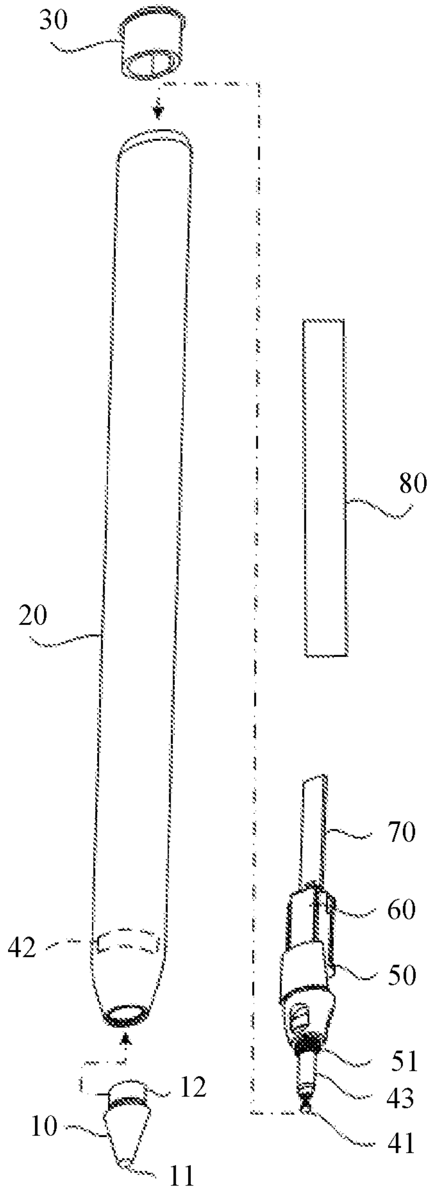

Referring to FIG. 6A and FIG. 6B, the Bluetooth stylus 100 may include a stylus tip 10, a stylus rod 20, and a rear cover 30. The interior of the stylus rod 20 is of a hollow structure. The stylus tip 10 and the rear end 30 are respectively located at two ends of the stylus rod 20. The rear cover 30 and the stylus rod 20 may be connected in a plug-in or clamping manner. For a fitting relationship between the stylus tip 10 and the stylus rod 20, refer to descriptions in FIG. 6B.

Referring to FIG. 6B, the Bluetooth stylus 100 further includes a main shaft assembly 50. The main shaft assembly 50 is located in the stylus rod 20, and the main shaft assembly 50 is slidably disposed in the stylus rod 20. The main shaft assembly 50 has an external thread 51, and the stylus tip 10 includes a writing end 11 and a connecting end 12. The connecting end 12 of the stylus tip 10 has an internal thread (not shown) fitting the external thread 51.

When the main shaft assembly 50 is assembled into the stylus rod 20, the connecting end 12 of the stylus tip 10 extends into the stylus rod 20 and is threadedly connected to the external thread 51 of the main shaft assembly 50. In some other examples, the connecting end 12 of the stylus tip 10 may alternatively be connected to the main shaft assembly 50 in a detachable manner such as clamping. The connecting end 12 of the stylus tip 10 is detachably connected to the main shaft assembly 50, to implement replacement of the stylus tip 10.

To detect pressure applied to the writing end 11 of the stylus tip 10, as shown in FIG. 6A, there is a gap 10*a* between the stylus tip 10 and the stylus rod 20. In this way, it can be ensured that when the writing end 11 of the stylus tip 10 is subjected to an external force, the stylus tip 10 can move toward the stylus rod 20, and movement of the stylus tip 10 drives the main shaft assembly 50 to move in the stylus rod 20. To detect the external force, as shown in FIG. 6B, a pressure sensing component 60 is disposed on the main shaft assembly 50. A part of the pressure sensing component 60 is fixedly connected to a fastening structure in the stylus rod 20, and a part of the pressure sensing component 60 is fixedly connected to the main shaft assembly 50. In this way, when the main shaft assembly 50 moves with the stylus tip 10, because the part of the pressure sensing component 60 is fixedly connected to the fastening structure in the stylus rod 20, movement of the main shaft assembly 50 drives deformation of the pressure sensing component 60, and the deformation of the pressure sensing component 60 is transferred to a circuit board 70 (for example, the pressure sensing component 60 and the circuit board 70 may be electrically connected through a conducting wire or a flexible circuit board). The circuit board 70 detects the pressure of the writing end 11 of the stylus tip 10 based on the deformation of the pressure sensing component 60, and therefore controls a line thickness of the writing end 11 based on the pressure of the writing end 11 of the stylus tip 10.

It should be noted that pressure detection of the stylus tip 10 includes but is not limited to the foregoing method. For example, a pressure sensor may alternatively be disposed in the writing end 11 of the stylus tip 10, and the pressure on the stylus tip 10 is detected by the pressure sensor.

In this embodiment, as shown in FIG. 6B, the Bluetooth stylus 100 further includes a plurality of electrodes. The plurality of electrodes may be, for example, a first transmitting electrode 41, a ground electrode 43, and a second transmitting electrode 42. The first transmitting electrode 41, the ground electrode 43, and the second transmitting electrode 42 are all electrically connected to the circuit board 70. The first transmitting electrode 41 may be located in the stylus tip 10 and close to the writing end 11. The circuit board 70 may be configured as a control board for providing signals respectively to the first transmitting electrode 41 and the second transmitting electrode 42. The first transmitting electrode 41 is configured to transmit a first signal. When the first transmitting electrode 41 is close to a touch control screen of the electronic device, a coupling capacitance may be formed between the first transmitting electrode 41 and the touch control screen of the electronic device, so that the electronic device can receive the first signal. The second transmitting electrode 42 is configured to transmit a second signal, and the electronic device can determine an inclination angle of the Bluetooth stylus 100 based on the received second signal. In this embodiment of this application, the second transmitting electrode 42 may be located on an inner wall of the stylus rod 20. In an example, the second transmitting electrode 42 may alternatively be located on the main shaft assembly 50.

The ground electrode 43 may be located between the first transmitting electrode 41 and the second transmitting electrode 42, or the ground electrode 43 may be located at an outer periphery of the first transmitting electrode 41 and the second transmitting electrode 42, and the ground electrode 43 is configured to reduce coupling between the first transmitting electrode 41 and the second transmitting electrode 42.

When the electronic device receives the first signal from the Bluetooth stylus 100, a capacitance value at a corresponding position on the touch screen changes. Accordingly, the electronic device may determine a position of the Bluetooth stylus 100 (or the stylus tip of the Bluetooth stylus 100) on the touch screen based on the change in the capacitance value on the touch screen. In addition, the electronic device may obtain the inclination angle of the Bluetooth stylus 100 by using a double-tip projection method in an inclination angle detection algorithm. Because positions of the first transmitting electrode 41 and the second transmitting electrode 42 in the Bluetooth stylus 100 are different, capacitance values at the two positions on the touch screen change when the electronic device receives the first signal and the second signal from the Bluetooth stylus 100. The electronic device may obtain the inclination angle of the Bluetooth stylus 100 based on a distance between the first transmitting electrode 41 and the second transmitting electrode 42 and a distance between the two positions at which the capacitance values on the touch screen change. For more detailed descriptions of obtaining the inclination angle of the Bluetooth stylus 100, refer to related descriptions of the double-tip projection method in the conventional technology.

In this embodiment of this application, as shown in FIG. 6B, the Bluetooth stylus 100 further includes a battery assembly 80, and the battery assembly 80 is configured to supply power to the circuit board 70.

It is obvious to a person skilled in the art that some specific details about the electronic device, the Bluetooth keyboard 300, and the Bluetooth stylus 100 that are presented above may not be required to practice particular implementation solutions or their equivalents. Therefore, it should be understood that, the foregoing descriptions are not intended to be exhaustive or to limit the present disclosure to the exact form described in this specification. On the contrary, it is obvious to a person of ordinary skill in the art that many modifications and variations are possible based on the foregoing teachings.

Figure 7A:
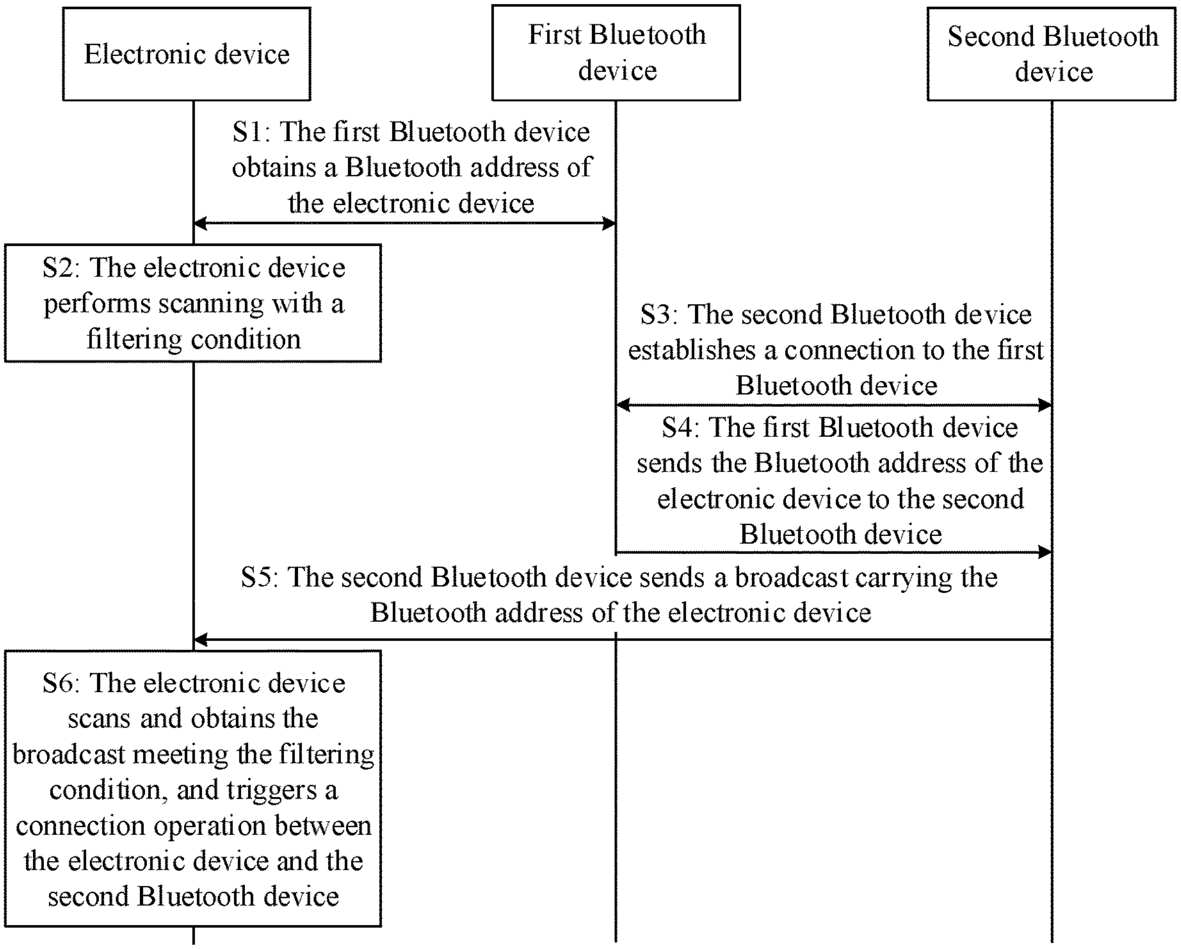
FIG. 7A, FIG. 7B, and FIG. 7C are respectively three flowcharts of a Bluetooth device pairing connection method performed by a terminal system according to an embodiment of the present invention.

For a terminal system including the electronic device, the first Bluetooth device, and the second Bluetooth device, when the three internal devices perform the Bluetooth device pairing connection method, for a specific process, reference may be made to FIG. 7A, including:

S1: The first Bluetooth device obtains a Bluetooth address of the electronic device. Because the first Bluetooth device has different types, there are different obtaining manners. If the first Bluetooth device is a Bluetooth device with classic Bluetooth, the first Bluetooth device directly records a classic Bluetooth address of a currently connected electronic device. If the first Bluetooth device is BLE, the first Bluetooth device records, during pairing, an equivalent address of the electronic device sent by the electronic device.

It should be noted that during broadcasting, the electronic device in an Android system uses the classic Bluetooth address of the electronic device as the equivalent address, generates, according to a specific rule, a random address that changes, and then broadcasts the random address. After pairing between BLE devices is completed, this equivalent address is sent to each other for next parsing of this random address. Therefore, the equivalent address is equivalent to a unique identifier of the electronic device in the first Bluetooth device. In other words, on the electronic device in the Android system, the equivalent address of the electronic device is the classic Bluetooth address of the electronic device.

Exemplarily, FIG. 1 is used as an example. The first Bluetooth device is the Bluetooth keyboard 300, and the electronic device is the tablet computer 200. If the Bluetooth keyboard 300 is a classic Bluetooth device, when the Bluetooth keyboard 300 starts pairing with the tablet computer 200, the Bluetooth keyboard 300 may record a classic Bluetooth address sent by the tablet computer 200 during pairing. The Bluetooth keyboard 300 may alternatively record, after successful pairing, the classic Bluetooth address of the tablet computer 200.

It may be understood that, in this embodiment of this application, the first Bluetooth device may further obtain another address of the electronic device. This is not limited in this embodiment of this application.

S2: The electronic device performs scanning with a filtering condition.

A specific process in which the electronic device performs scanning is as follows: A controller built-in service of the electronic device delivers a filter to a Bluetooth chip of the electronic device, so that the Bluetooth chip starts to scan whether each broadcast meets the filtering condition. The controller built-in service refers to an application that runs in the background and is responsible for processing pairing work.

The filtering condition is that data segment content of the broadcast includes the Bluetooth address of the electronic device. The Bluetooth chip reports a scanned broadcast to the controller built-in service only when data segment content of the broadcast includes the Bluetooth address of the electronic device.

Another specific process in which the electronic device performs scanning is as follows: The electronic device delivers the filter in the background as soon as the electronic device is turned on, so that the Bluetooth chip determines, by using the filter, whether each broadcast meets the filtering condition, and does not need to wait for the Bluetooth keyboard to connect to the electronic device before delivering the filter. Alternatively, in actual application, a dedicated application program may be used. The filter may be delivered by the application program provided that the application program is enabled, so that the Bluetooth chip determines, by using the filter, whether each broadcast meets the filtering condition.

In some other embodiments, when detecting that the electronic device is connected to the first Bluetooth device, the electronic device may start scanning. Alternatively, the electronic device may start scanning as soon as the electronic device is turned on.

The foregoing is only some specific examples in a process in which the electronic device performs scanning. Actual application is not limited thereto, and other manners may alternatively be used, which fall within the protection scope of this application.

S3: The second Bluetooth device establishes a connection to the first Bluetooth device.

In actual application, a convenient connection may be established. For example, the second Bluetooth device may establish the connection to the first Bluetooth device by using a coil or NFC in a manner of magnetic absorption, touching, or the like. A specific example is as follows: After the Bluetooth stylus 100 shown in FIG. 4A is inserted into the accommodating portion 303 of the Bluetooth keyboard 300 (as shown in FIG. 4B), a corresponding coil is built in each of the accommodating portion 303 and the Bluetooth stylus 100, so that both the Bluetooth keyboard 300 and the Bluetooth stylus 100 learn of existence of each other. In addition, a connection may be established by using the coil, so that a small amount of data can be transmitted between the Bluetooth keyboard 300 and the Bluetooth stylus 100, for example, performing steps S4 and S5.

S4: The first Bluetooth device sends the Bluetooth address of the electronic device to the second Bluetooth device.

For example, after determining the existence of the Bluetooth stylus 100, the Bluetooth keyboard 300 may perform step S4 to send the Bluetooth address of the electronic device to the Bluetooth stylus 100. In addition, in actual application, depending on specific settings of the two Bluetooth devices, a specific form in which the Bluetooth address is sent between the two Bluetooth devices may be sent by using the coil in the accommodating portion 303 in FIG. 4B, or may be sent by using NFC, or in any other manner in which data transmission between the two Bluetooth devices can be implemented, which falls within the protection scope of this application.

S5: The second Bluetooth device sends a broadcast carrying the Bluetooth address of the electronic device.

Two devices with Bluetooth modules want to establish a connection. A first step is as follows: A slave device (namely, the second Bluetooth device) sends a broadcast to the outside, and a master device (namely, the electronic device) initiates a connection request after finding the broadcast. For example, after detecting that the Bluetooth stylus 100 is inserted into the Bluetooth keyboard 300, broadcasting may be started.

When the second Bluetooth device sends a broadcast to indicate that the second Bluetooth device is in a connectable state, corresponding information may be added to data segment content in the broadcast sent by the second Bluetooth device, for example, a Bluetooth address of an electronic device to which the second Bluetooth device is pre-connected is added, so that the broadcast can meet the filtering condition of the electronic device.

Figure 8:
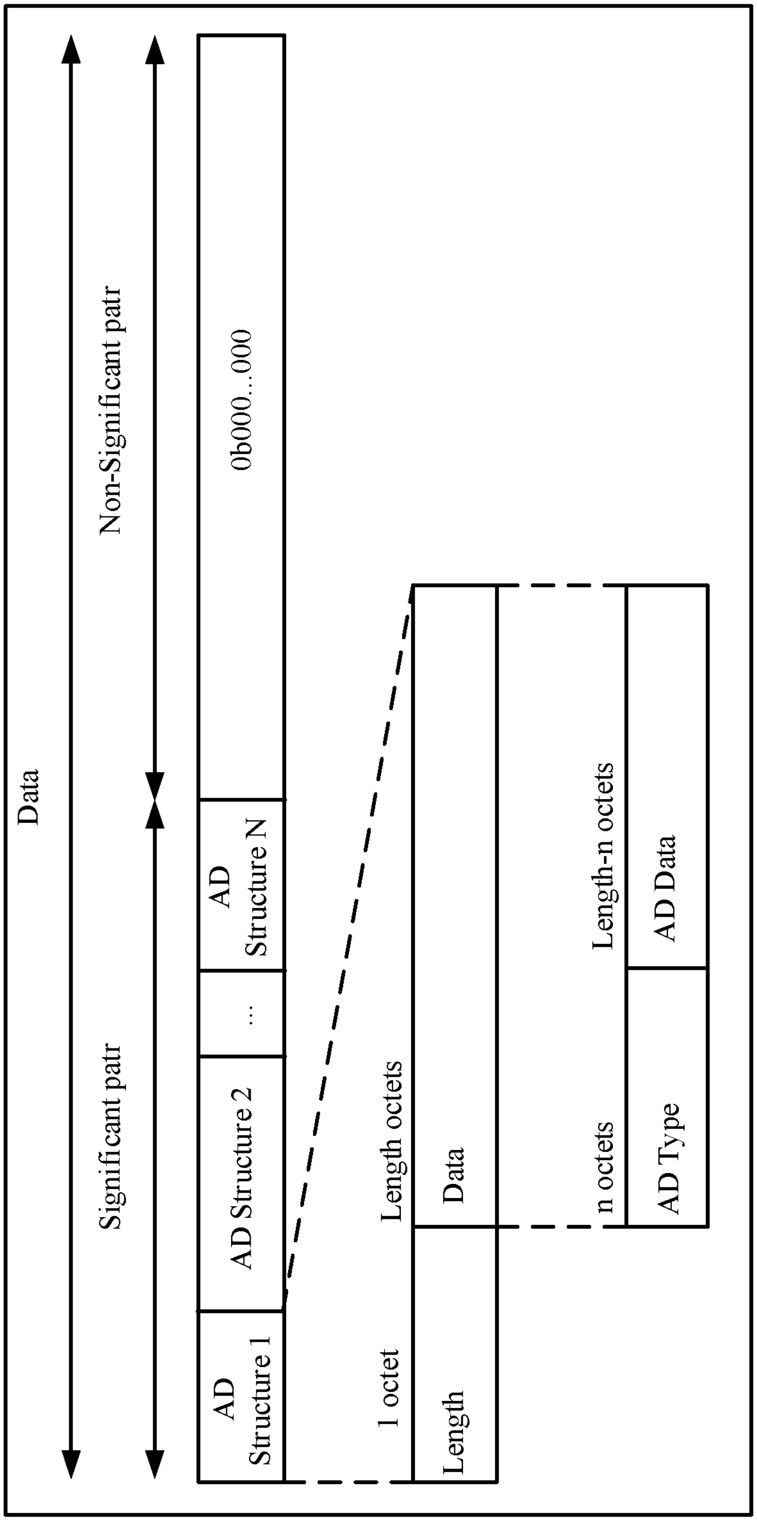
FIG. 8 is a schematic diagram of a BLE broadcast format according to an embodiment of the present invention.

A BLE broadcast format is used as an example. Referring to FIG. 8, Data of each broadcast data packet is 31 bytes, and the data packet is divided into two parts: significant (significant) data and non-significant (non-significant) data. The significant data part includes several broadcast data units (an AD Structure 1, an AD Structure 2, and an AD Structure N), and each broadcast data unit includes a length (Length), a type (AD Type), and data (AD Data) that are of the broadcast data unit. The length is a length occupied by the type and the data. Because the length of the broadcast data packet must be 31 bytes, if the significant data part is less than 31 bytes, the rest is filled with 0, and this part of data is non-significant data.

If the Bluetooth address of the electronic device is to be added to the broadcast, a type of the broadcast data unit of the broadcast should be Manufacture Specific Data, namely, manufacturer data, and information such as a name of a manufacturer or the Bluetooth address may be stored. In addition, data under this type should be the Bluetooth address of the electronic device.

After the foregoing information is added, the second Bluetooth device may send the broadcast, and the broadcast of the second Bluetooth device includes a Bluetooth address of the second Bluetooth device.

S6: The electronic device scans and obtains the broadcast meeting the filtering condition, and triggers a connection operation between the electronic device and the second Bluetooth device.

When performing scanning with a filtering condition, the electronic device checks whether the data segment content in each broadcast includes the Bluetooth address of the electronic device, and if yes, determines that the broadcast meets the filtering condition, or otherwise, determines that the broadcast does not meet the filtering condition. Specifically, the Bluetooth chip in the electronic device may scan the broadcast. When scanning and obtaining the broadcast in which the type of the broadcast data unit in the data segment content in the broadcast is Manufacture Specific Data and the data under the type is the Bluetooth address of the electronic device, the Bluetooth chip determines that the broadcast meets the filtering condition, and then extracts the Bluetooth address of the second Bluetooth device in the broadcast, and reports the Bluetooth address of the second Bluetooth device to the controller built-in service in the electronic device that is responsible for managing pairing work, so that the controller built-in service triggers the connection operation between the electronic device and the second Bluetooth device, to complete a pairing connection process between the electronic device and the second Bluetooth device.

The connection operation may be specifically directly connecting, or first asking, by popping up a dialog box, a user whether to perform connecting, and then performing connecting after receiving an affirmative reply.

Figure 7B:
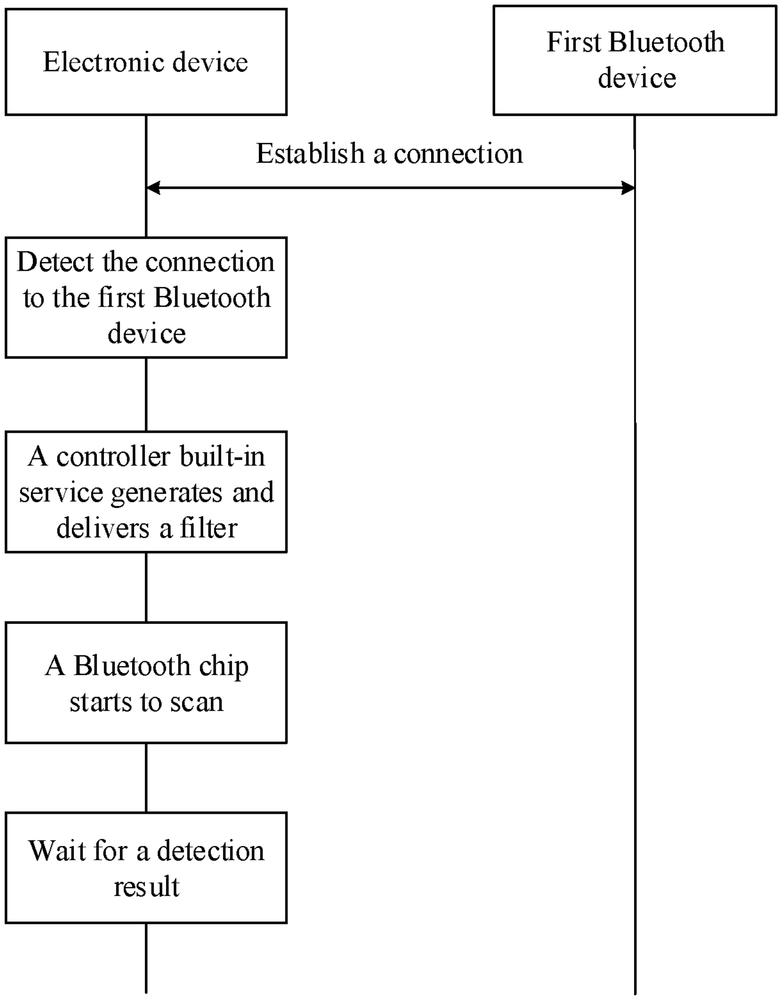

For the electronic device, a specific example is shown in FIG. 7B. After the electronic device detects that the electronic device is connected to the first Bluetooth device, the controller built-in service of the electronic device that is responsible for processing pairing work generates and delivers the filter to the Bluetooth chip of the electronic device, and then the Bluetooth chip starts to scan whether each broadcast meets the filtering condition, and waits for a detection result. In a process in which the Bluetooth chip waits for the detection result, the Bluetooth chip may specifically perform periodic scanning, and maintain a continuous scanning action for a preset time period. In addition, the Bluetooth chip may stop the scanning action after scanning and obtaining the broadcast that meets the filtering condition, or may stop the scanning action after the preset time expires, or after detecting that the first Bluetooth device is disconnected from the second Bluetooth device, the first Bluetooth device may notify the Bluetooth chip to stop the scanning action, depending on a specific application environment of the electronic device, which falls within the protection scope of this application.

Figure 7C:
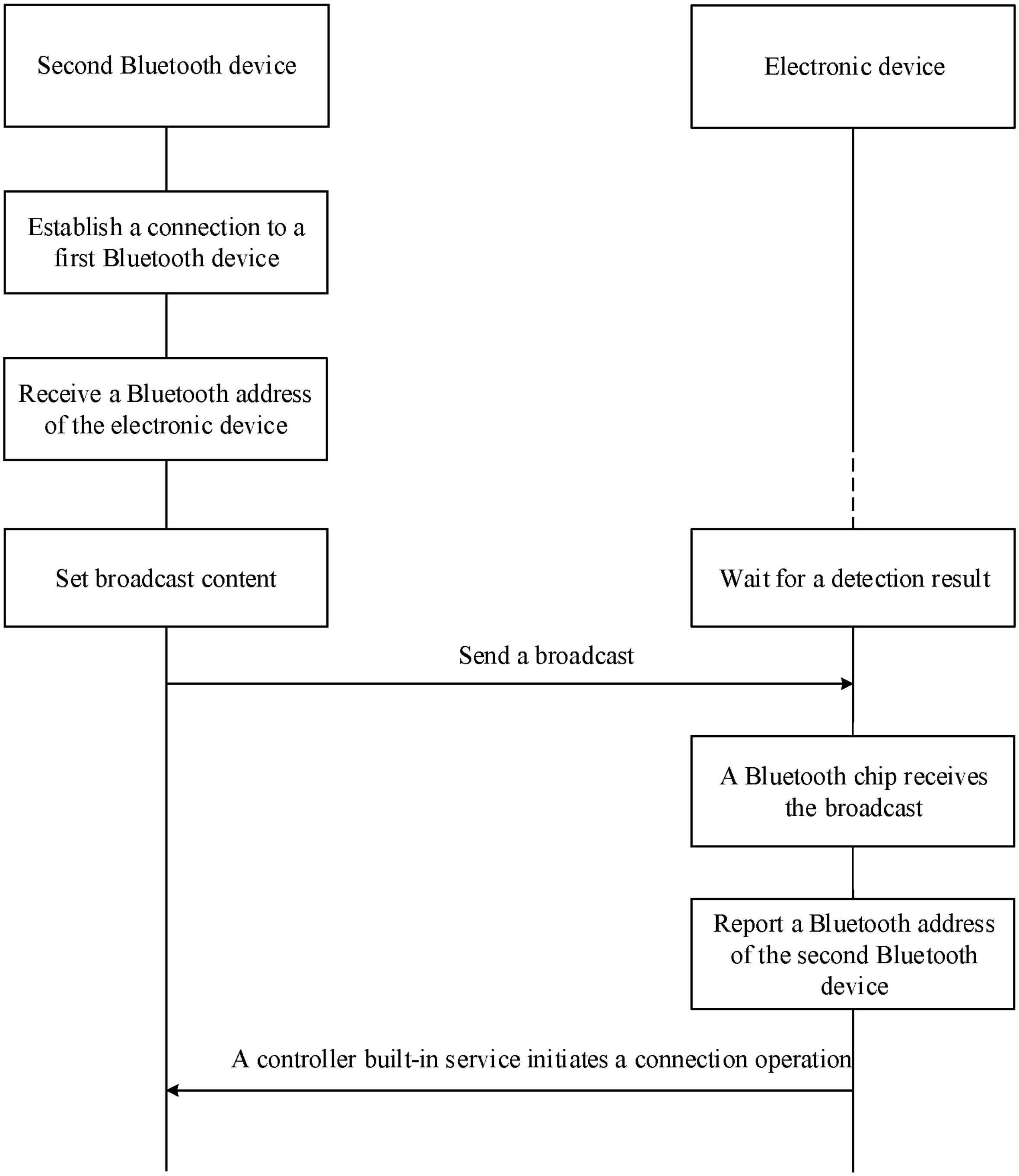

For the second Bluetooth device, a specific example is shown in FIG. 7C. After establishing a connection to the first Bluetooth device, the second Bluetooth device receives, by using a coil, the Bluetooth address of the electronic device that is sent by the first Bluetooth device, and then sets broadcast content, so that the broadcast meets the filtering condition of scanning performed by the electronic device, and then sends the broadcast. When receiving the broadcast and detecting that the broadcast meets the filtering condition, the Bluetooth chip of the electronic device reports the Bluetooth address of the second Bluetooth device in the broadcast to the controller built-in service of the electronic device, so that the controller built-in service initiates the connection operation between the electronic device and the second Bluetooth device.

It can be found from the foregoing process that, in this embodiment, information common between the first Bluetooth device and the electronic device, namely, the Bluetooth address of the electronic device, is used to transfer the Bluetooth address of the second Bluetooth device to the electronic device for pairing, to improve experience of pairing the second Bluetooth device with the electronic device. In addition, the Bluetooth device pairing connection method provided in this embodiment has better universality, and is applicable to both the first Bluetooth device with classic Bluetooth and the first Bluetooth device with BLE. In addition, there is no need for additional information exchange between the first Bluetooth device and the electronic device, eliminating overheads of a private channel between the first Bluetooth device and the electronic device.

According to the Bluetooth device pairing connection method, the second Bluetooth device can be connected to the electronic device. Then, if the second Bluetooth device is not operated by the user within a preset time period, the second Bluetooth device further enters a sleep state, or an accident occurs, for example, power is exhausted or a connection distance is exceeded, the connection between the electronic device and the second Bluetooth device can be broken.

Subsequently, in a case in which the electronic device knows the Bluetooth address of the second Bluetooth device, provided that the second Bluetooth device sends the broadcast again, an indirect transmission process of the first Bluetooth device is no longer required in this case, and the broadcast sent by the second Bluetooth device does not need to carry the Bluetooth address of the electronic device again. Even if all data in the broadcast data packet of the second Bluetooth device is non-significant data, the Bluetooth address of the second Bluetooth device included in the broadcast may enable the electronic device to trigger to connection operation to implement reconnection. In other words, the indirect transmission process of the first Bluetooth device is required only when pairing connection is performed for the first time between the second Bluetooth device and the electronic device, further improving user experience.

Figure 9:
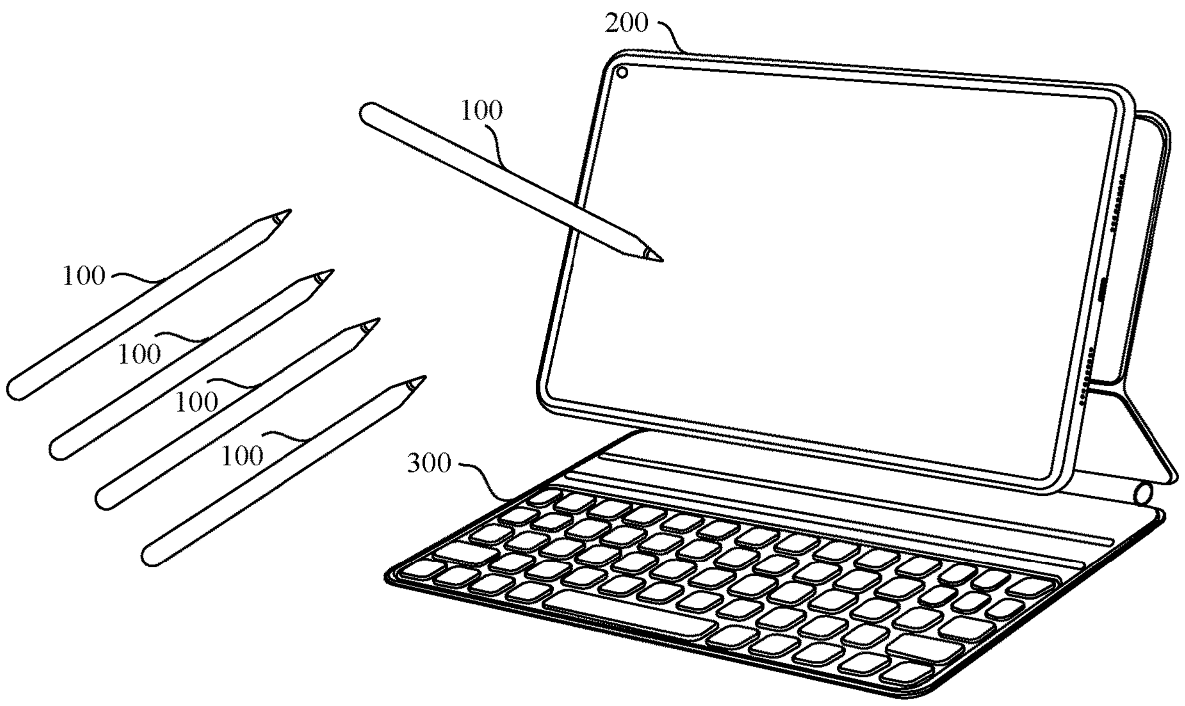
FIG. 9, FIG. 10, and FIG. 11 are respectively schematic diagrams of application scenarios of multi-device collaboration in a terminal system according to different embodiments of the present invention.

It should be noted that when one tablet computer 200 is paired with the Bluetooth keyboard, a pairing connection with the Bluetooth stylus may be implemented by using the foregoing process at low costs. However, in a specific actual application process, a quantity of each of the electronic device, the first Bluetooth device, and the second Bluetooth device may not be just one, and there may be a plurality of possible application scenarios. An example is as follows:

As shown in FIG. 9, when drawing on the tablet computer 200 (for example, 200 shown in FIG. 9), the user may use a plurality of Bluetooth styluses in a same series (for example, each 100 shown in FIG. 9), and these Bluetooth styluses are communicatively connected to each other. After obtaining a Bluetooth address of the tablet computer 200 by using the Bluetooth keyboard (for example, 300 shown in FIG. 9), any Bluetooth stylus may notify the other Bluetooth stylus of the Bluetooth address of the tablet computer 200 by using a corresponding communication connection relationship, so that the other Bluetooth stylus can also learn of the Bluetooth address of the tablet computer 200. Then, the other Bluetooth stylus may also send a broadcast meeting the foregoing filtering condition, so that after obtaining a Bluetooth address of the other Bluetooth stylus, the tablet computer 200 triggers a connection operation between the tablet computer 200 and the other Bluetooth stylus. When the second Bluetooth device is another device, provided that a communication connection between a plurality of second Bluetooth devices can be implemented, connections between the plurality of second Bluetooth devices and a same electronic device can be implemented according to the foregoing principle. That is, the Bluetooth device pairing connection method can be applied between one electronic device and the plurality of second Bluetooth devices communicatively connected to each other.

Figure 10:
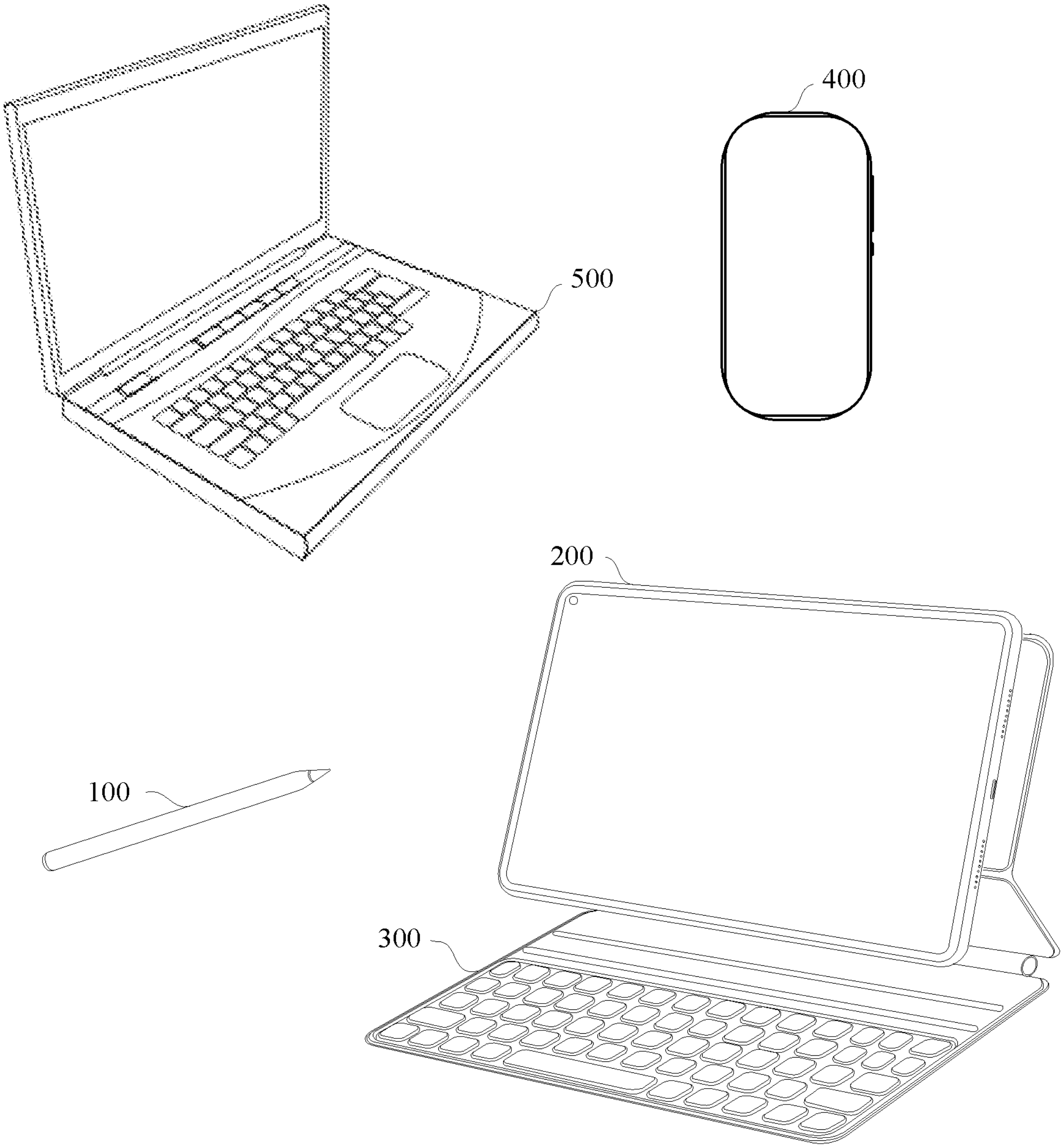

In addition, as shown in FIG. 10, when the user records a plurality of electronic devices in a same account in cloud space or a network disk, for example, a mobile phone 400, a notebook computer 500, and the tablet computer 200 all belong to the same account, and the tablet computer 200 is connected to the Bluetooth stylus 100 by using the paired Bluetooth keyboard 300 by using the Bluetooth device pairing connection method, the tablet computer 200 may deliver Bluetooth addresses of the mobile phone 400 and the notebook computer 500 to the Bluetooth stylus 100 at a single time. Then, the Bluetooth stylus 100 may send corresponding broadcasts one by one based on a preset time and a preset sequence. If the mobile phone 400 and the notebook computer 500 are also within a transmission range of the broadcast of the Bluetooth stylus 100, and also have requirements of connecting to the Bluetooth stylus 100, connection operations between both the mobile phone 400 and the notebook computer 500 and the Bluetooth stylus 100 may be triggered separately, so that both the mobile phone 400 and the notebook computer 500 can be connected to the Bluetooth stylus 100. That is, the Bluetooth device pairing connection method can be applied between the plurality of electronic devices in the same account and a same second Bluetooth device.

Figure 11:
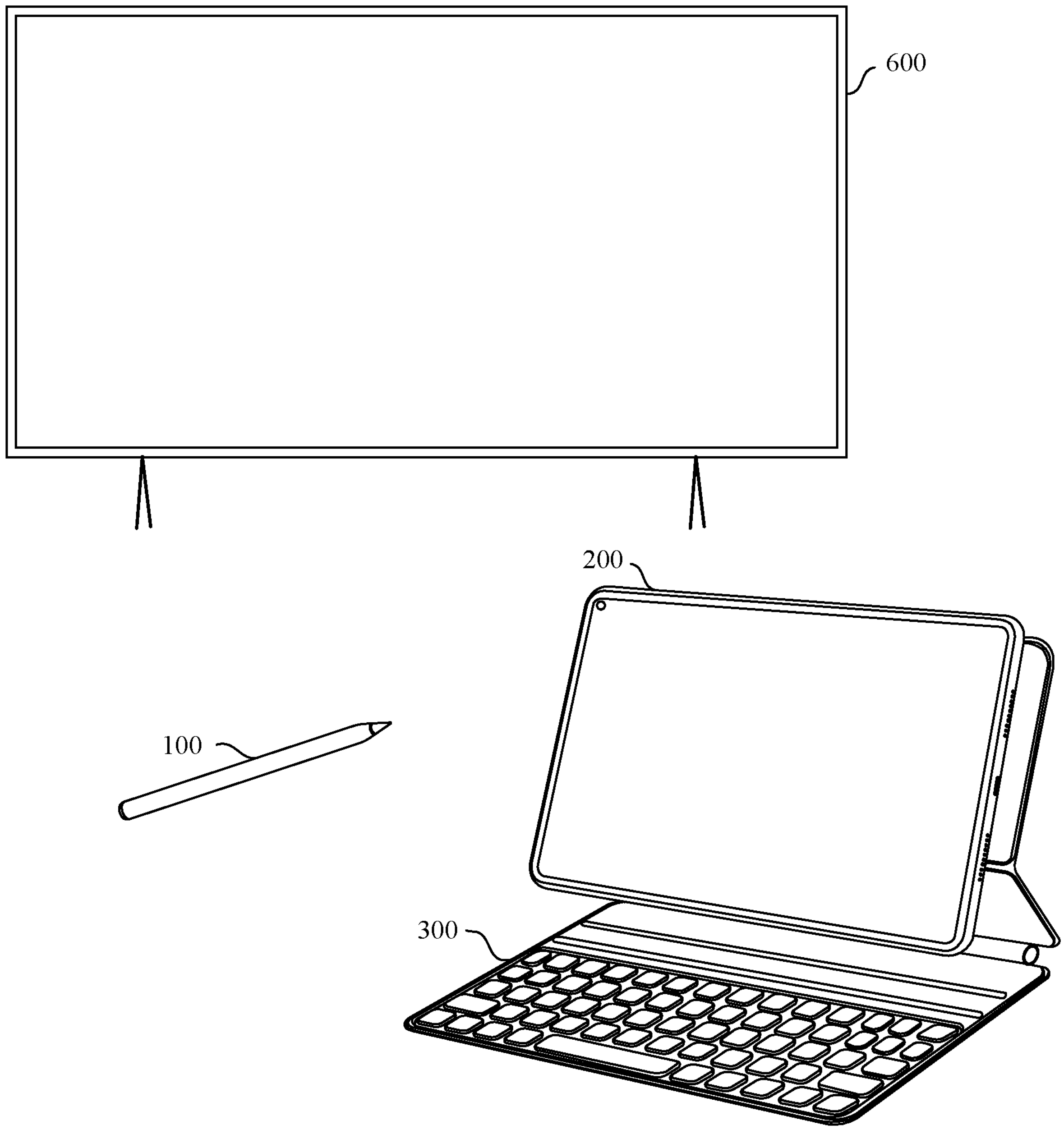

In actual application, as shown in FIG. 11, if each electronic device is located in a same space and has a requirement of connecting to a same Bluetooth stylus 100, for example, the user, as an interpreter, wants to conveniently operate different electronic devices, for example, the tablet computer 200 and a smart large screen 600, by using a same Bluetooth stylus 100 in a conference room, after being connected to the Bluetooth stylus 100 by using the paired Bluetooth keyboard 300, the tablet computer 200 may obtain a Bluetooth address of the smart large screen 600 by using any communication mode, for example, wifi or a local area network, between the tablet computer 200 and the smart large screen 600, and then notify the Bluetooth stylus 100 of the Bluetooth address of the smart large screen 600, so that a connection operation can be triggered after the Bluetooth stylus 100 sends a corresponding broadcast. Then, after pulling the Bluetooth stylus 100 from the tablet computer 200 to the smart large screen 600, the user may also use the Bluetooth stylus 100 on the smart large screen 600. That is, the Bluetooth device pairing connection method can be further applied between a plurality of electronic devices that do not belong to a same account and a same second Bluetooth device.

In addition, in the foregoing several cases, there may be any quantity of first Bluetooth devices paired with the electronic device, and a quantity and types of the first Bluetooth devices are not specifically limited, provided that there is one first Bluetooth device that can send the Bluetooth address of the electronic device to a pre-connected second Bluetooth device.

That is, the Bluetooth device pairing connection method can be applied to a multi-device collaboration scenario. Regardless of a drawing scenario, an office scenario, or another scenario, quantities of devices in three roles may be determined based on a specific application environment of the devices, which falls within the protection scope of this application.

Figure 12:
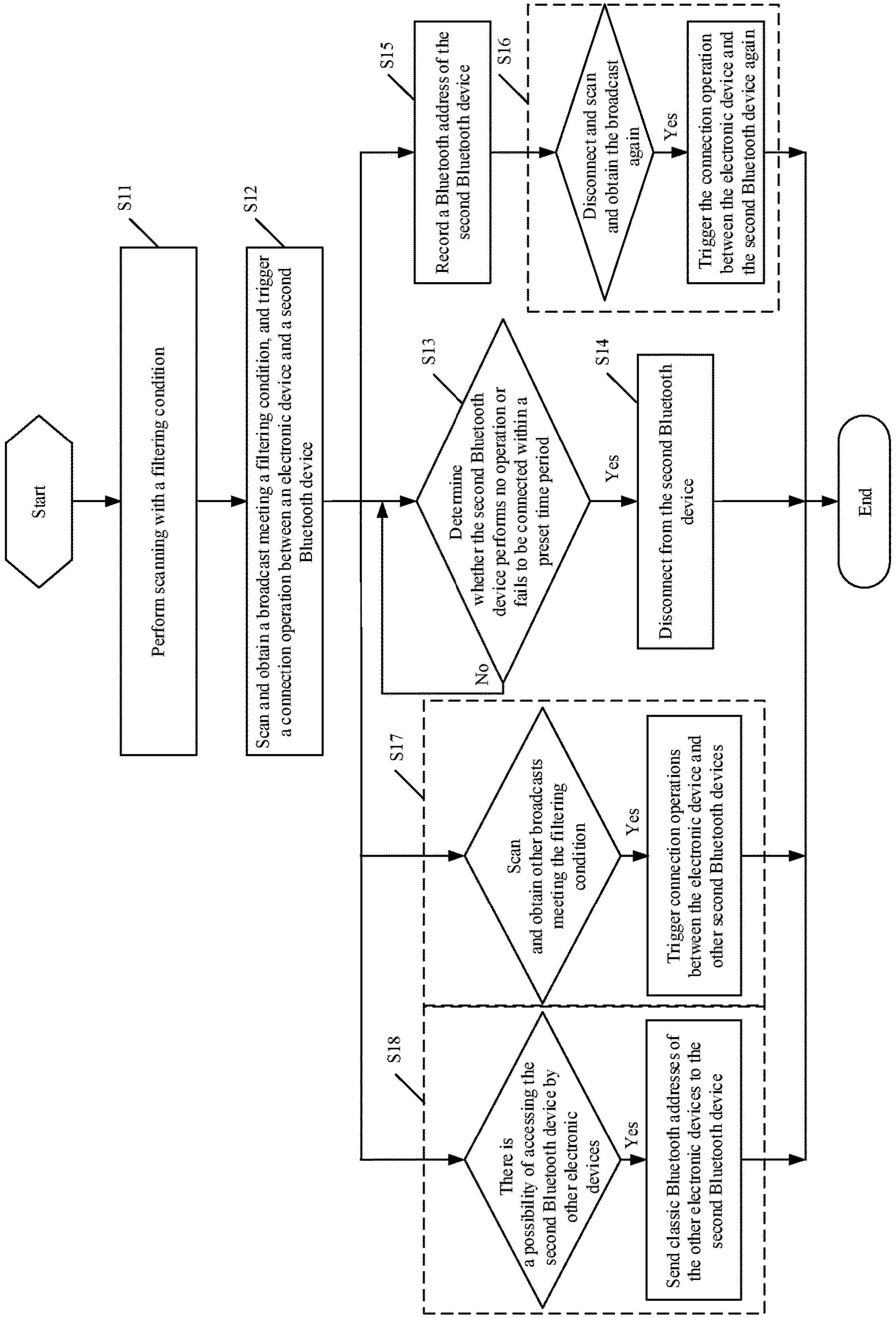
FIG. 12, FIG. 13, and FIG. 14 are respectively flowcharts of a Bluetooth device pairing connection method performed by different executors according to different embodiments of the present invention.

Another embodiment of the present invention provides an electronic device, and the electronic device stores a computer program. The computer program is executed by the electronic device to implement a Bluetooth device pairing connection method shown in FIG. 12.

S10: The electronic device establishes a connection to a first Bluetooth device, and sends a Bluetooth address of the electronic device to the first Bluetooth device in a process of establishing the connection.

For a specific execution process of S10, refer to specific descriptions of step S1 in the foregoing embodiment. However, regardless of whether the Bluetooth address of the electronic device is a classic Bluetooth address or an equivalent Bluetooth address, the Bluetooth address is carried in a broadcast sent by the electronic device in the process in which the electronic device establishes the connection to the first Bluetooth device.

S11: The electronic device performs scanning with a filtering condition.

The filtering condition is that data segment content of the broadcast includes the Bluetooth address of the electronic device.

Optionally, step S11 includes but is not limited to any one of the following cases:

(1) The electronic device determines whether there is the first Bluetooth device that is paired with and connected to the electronic device. If a determining result is yes, a controller built-in service of the electronic device delivers a filter to a Bluetooth chip of the electronic device. The Bluetooth chip scans, by using the filter, whether each broadcast meets the filtering condition.

(2) As soon as the electronic device is turned on, a controller built-in service of the electronic device delivers a filter to a Bluetooth chip of the electronic device. The Bluetooth chip scans, by using the filter, whether each broadcast meets the filtering condition.

(3) An application program installed on the electronic device delivers a filter to a Bluetooth chip of the electronic device when being in an enabled state. The Bluetooth chip scans, by using the filter, whether each broadcast meets the filtering condition.

For specific execution processes of the foregoing cases, refer to specific descriptions of step S2 in the foregoing embodiment.

S12: The electronic device scans and obtains a broadcast meeting the filtering condition, and triggers a connection operation between the electronic device and a second Bluetooth device.

The broadcast is generated by the second Bluetooth device after the first Bluetooth device sends, when paired with the electronic device, the obtained Bluetooth address of the electronic device to the second Bluetooth device that establishes a connection to the first Bluetooth device.

Step S12 may specifically include: The Bluetooth chip of the electronic device scans and obtains the broadcast meeting the filtering condition, and reports a Bluetooth address of the second Bluetooth device included in the broadcast to the controller built-in service of the electronic device; and the controller built-in service triggers the connection operation between the electronic device and the second Bluetooth device. The connection operation may be specifically directly connecting or asking for a connection by using a dialog box.

For a specific execution process of step S12, refer to specific descriptions of step S6 in the foregoing embodiment.

Optionally, after step S12, the method further includes:

S13: The electronic device determines whether the second Bluetooth device performs no operation or fails to be connected within a preset time period.

If a determining result is yes, step S14 is performed.

S14: The electronic device disconnects from the second Bluetooth device.

A specific example is as follows: In 5 minutes or 10 minutes, if the second Bluetooth device is always stationary and no action is detected, the connection between the second Bluetooth device and the electronic device may be broken. Alternatively, when the second Bluetooth device encounters accidents such as power exhaustion or exceeding a connection distance, the connection between the electronic device and the second Bluetooth device may be broken.

Optionally, after step S12, the method may further include:

S15: The electronic device records the Bluetooth address of the second Bluetooth device.

S16: After the electronic device disconnects from the second Bluetooth device, if the electronic device scans and obtains the broadcast of the second Bluetooth device, the electronic device triggers the connection operation between the electronic device and the second Bluetooth device again.

For a specific execution process of S16, refer to descriptions about a reconnection scenario in the foregoing embodiment.

In addition, in an application scenario of a plurality of second Bluetooth devices, after step S12, the method may further include:

S17: The electronic device scans and obtains a broadcast that meets the filtering condition and that is sent by another second Bluetooth device, and triggers a connection operation between the electronic device and the another second Bluetooth device.

The broadcast sent by the another second Bluetooth device is generated by the another second Bluetooth device after the second Bluetooth device obtains the Bluetooth address of the electronic device and sends the Bluetooth address of the electronic device to the another second Bluetooth device communicatively connected to the second Bluetooth device.

In an application scenario of a plurality of electronic devices, after step S12, the method may further include:

S18: When determining that there is a possibility of accessing the second Bluetooth device by other electronic devices, the electronic device sends Bluetooth addresses of the other electronic devices to the second Bluetooth device, so that the second Bluetooth device sends corresponding broadcasts one by one based on a preset time and a preset sequence, and further each of the other electronic devices triggers a connection operation between each of the other electronic devices and the second Bluetooth device.

The determining that there is a possibility of accessing the second Bluetooth device by other electronic devices includes two cases: One case is to perform determining by using a same account in cloud space or a network disk, and the other case is to learn a Bluetooth address of another electronic device A by using any communication mode (such as wifi or a local area network).

For a specific process and principle of the Bluetooth device pairing connection method, refer to the foregoing embodiment and content shown in FIG. 7A to FIG. 7C. Details are not described herein again.

Figure 13:
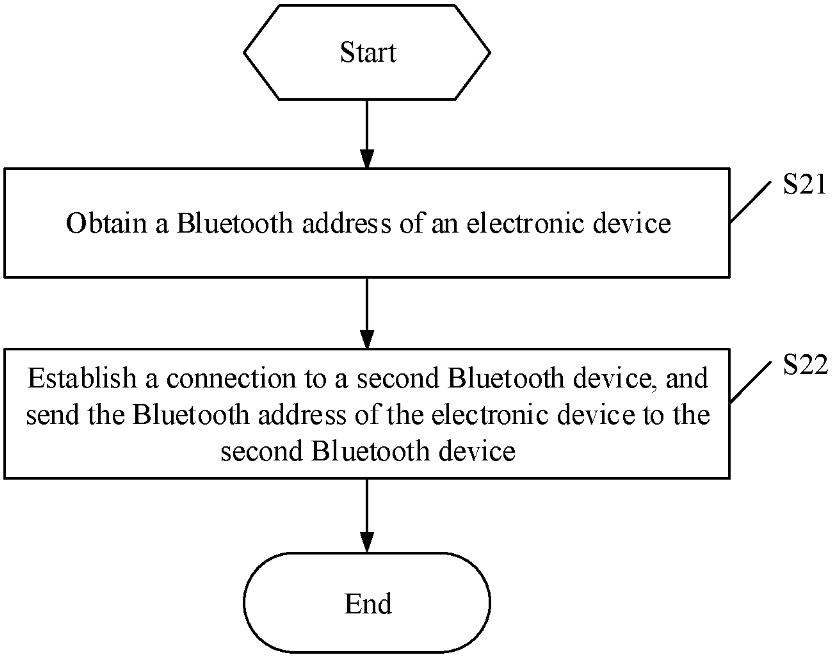

Another embodiment of the present invention further provides a Bluetooth device. As a first Bluetooth device, the Bluetooth device stores a computer program. The computer program of the Bluetooth device is executed by the Bluetooth device to implement a Bluetooth device pairing connection method shown in FIG. 13.

S21: The first Bluetooth device establishes a connection to an electronic device, and obtains a Bluetooth address of the electronic device.

If the first Bluetooth device is a Bluetooth device with classic Bluetooth, the obtaining a Bluetooth address of the electronic device includes: directly recording, in a process of establishing the connection or after the connection is established, a Bluetooth address of the currently connected electronic device. If the first Bluetooth device is a Bluetooth low energy device, the obtaining a Bluetooth address of the electronic device includes: recording, in a process of establishing the connection, an equivalent address of the electronic device sent by the electronic device.

For a specific process, refer to specific descriptions of step S1 in the foregoing embodiment.

S22: The first Bluetooth device establishes a connection to a second Bluetooth device, and sends the Bluetooth address of the electronic device to the second Bluetooth device, so that the second Bluetooth device can generate a broadcast carrying the Bluetooth address to further meet a filtering condition of the electronic device, and after obtaining a Bluetooth address of the second Bluetooth device by using the broadcast, the electronic device triggers a connection operation between the electronic device and the second Bluetooth device.

For a specific process of S22, refer to specific descriptions of steps S3 and S4 in the foregoing embodiment.

In step S22, a specific manner in which the first Bluetooth device establishes the connection to the second Bluetooth device and transmits the Bluetooth address may be to use a coil or NFC, or may be another manner in which a small amount of data can be transmitted, which is not specifically limited herein.

For a specific process and principle of the Bluetooth device pairing connection method, refer to the foregoing embodiment and content shown in FIG. 7A to FIG. 7C. Details are not described herein again.

Figure 14:
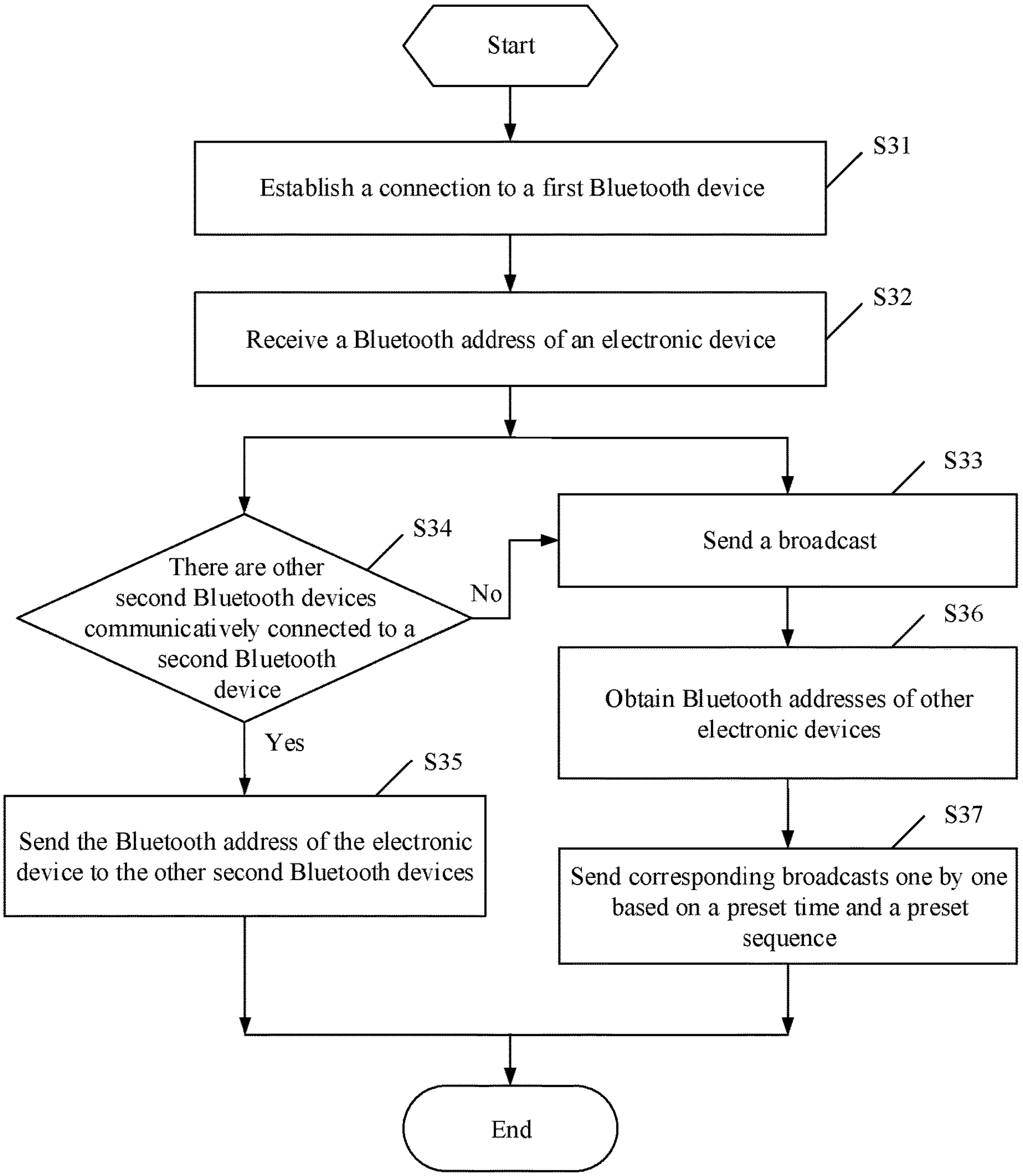

Another embodiment of the present invention further provides another Bluetooth device. As a second Bluetooth device, the Bluetooth device stores a computer program. The computer program of the Bluetooth device is executed by the Bluetooth device to implement a Bluetooth device pairing connection method shown in FIG. 14.

S31: The second Bluetooth device establishes a connection to a first Bluetooth device.

Specifically, the second Bluetooth device may be adsorbed to the first Bluetooth device or touch the first Bluetooth device, to establish the connection to the first Bluetooth device by using a coil or NFC.

For a specific process of S31, refer to specific descriptions of step S3 in the foregoing embodiment.

S32: The second Bluetooth device receives a Bluetooth address of an electronic device sent by the first Bluetooth device.

Specifically, the second Bluetooth device may receive, by using a coil or NFC, the Bluetooth address of the electronic device sent by the first Bluetooth device. For a specific process of S32, refer to specific descriptions of step S4 in the foregoing embodiment.

In addition, the Bluetooth address is obtained by the first Bluetooth device in a process of establishing a connection to the electronic device or after the connection is established.

S33: The second Bluetooth device sends a broadcast.

The broadcast carries the Bluetooth address of the electronic device, which meets a filtering condition of the electronic device, so that after obtaining a Bluetooth address of the second Bluetooth device by using the broadcast, the electronic device triggers a connection operation between the electronic device and the second Bluetooth device.

For a specific process of S33, refer to specific descriptions of step S5 in the foregoing embodiment.

In an application scenario of a plurality of second Bluetooth devices, after step S32, the method may further include:

S34: The second Bluetooth device determines whether there are other second Bluetooth devices communicatively connected to the second Bluetooth device.

If a determining result is yes, step S35 is performed.

S35: The second Bluetooth device sends the Bluetooth address of the electronic device to the other second Bluetooth devices, so that each of the other second Bluetooth devices sends a broadcast meeting the filtering condition, to help the electronic device trigger a corresponding connection operation.

In an application scenario of a plurality of electronic devices, after step S33, the method may further include:

S36: The second Bluetooth device obtains Bluetooth addresses of other electronic devices sent by the electronic device.

S37: The second Bluetooth device sends corresponding broadcasts one by one based on a preset time and a preset sequence, so that each of the other electronic devices triggers a connection operation between each of the other electronic devices and the second Bluetooth device.

For a specific process and principle of the Bluetooth device pairing connection method, refer to the foregoing embodiment and content shown in FIG. 7A to FIG. 7C. Details are not described herein again.

Another embodiment of the present invention further provides a terminal system. As shown in FIG. 1 and FIG. 9-FIG. 11, the terminal system includes at least one electronic device according to the foregoing embodiments and at least two Bluetooth devices according to the foregoing embodiments. At least one Bluetooth device serves as a first Bluetooth device, and at least one Bluetooth device serves as a second Bluetooth device, to implement the Bluetooth device pairing connection method shown in FIG. 7.

For a specific process and principle of the Bluetooth device pairing connection method, refer to the foregoing embodiment and content shown in FIG. 7A to FIG. 7C. Details are not described herein again.

For optional devices and connection manners of the electronic device, the first Bluetooth device, and the second Bluetooth device, refer to the foregoing embodiments. Details are not described herein again.

The foregoing descriptions are merely specific implementations of this application, but are not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. A Bluetooth device pairing connection method, applied to an electronic device, wherein the Bluetooth device pairing connection method comprises:

establishing, by the electronic device, a connection to a first Bluetooth device, and sending a Bluetooth address of the electronic device to the first Bluetooth device in a process of establishing the connection;

performing, by the electronic device, scanning with a filtering condition, wherein the filtering condition is that data segment content of a broadcast comprises the Bluetooth address of the electronic device; and scanning and obtaining, by the electronic device, a broadcast meeting the filtering condition, and triggering a connection operation between the electronic device and a second Bluetooth device, wherein the broadcast comprising the Bluetooth address of the electronic device is generated by the second Bluetooth device after the first Bluetooth device sends the Bluetooth address of the electronic device to the second Bluetooth device that establishes a connection to the first Bluetooth device.

2. The Bluetooth device pairing connection method according to claim 1, wherein if the first Bluetooth device is a Bluetooth device with classic Bluetooth, the Bluetooth address of the electronic device is a classic Bluetooth address of the electronic device; or if the first Bluetooth device is a Bluetooth low energy device, the Bluetooth address of the electronic device is an equivalent address of the electronic device.

3. The Bluetooth device pairing connection method according to claim 1, wherein the performing, by the electronic device, scanning with a filtering condition comprises:

delivering, by a controller built-in service of the electronic device, a filter to a Bluetooth chip of the electronic device; and scanning, by the Bluetooth chip by using the filter, whether each broadcast meets the filtering condition.

4. The Bluetooth device pairing connection method according to claim 1, wherein the performing, by the electronic device, scanning with a filtering condition comprises:

delivering, by an application program installed on the electronic device, a filter to a Bluetooth chip of the electronic device when being in an enabled state; and scanning, by the Bluetooth chip by using the filter, whether each broadcast meets the filtering condition.

5. The Bluetooth device pairing connection method according to claim 1, wherein the scanning and obtaining, by the electronic device, a broadcast meeting the filtering condition, and triggering a connection operation between the electronic device and a second Bluetooth device comprises:

scanning and obtaining, by a Bluetooth chip of the electronic device, the broadcast meeting the filtering condition, and reporting, to a controller built-in service of the electronic device, a Bluetooth address of the second Bluetooth device comprised in the broadcast; and triggering, by the controller built-in service, the connection operation between the electronic device and the second Bluetooth device.

6. The Bluetooth device pairing connection method according to claim 1, wherein the connection operation comprises a direct connection or a dialog box inquiry connection.

7. The Bluetooth device pairing connection method according to claim 1, after the scanning and obtaining, by the electronic device, a broadcast meeting the filtering condition, and triggering a connection operation between the electronic device and a second Bluetooth device, further comprising:

determining, by the electronic device, whether the second Bluetooth device performs no operation or fails to be connected within a preset time period; and if a determining result is yes, breaking, by the electronic device, a connection between the electronic device and the second Bluetooth device.

8. The Bluetooth device pairing connection method according to claim 1, after the scanning and obtaining, by the electronic device, a broadcast meeting the filtering condition, and triggering a connection operation between the electronic device and a second Bluetooth device, further comprising:

recording, by the electronic device, a Bluetooth address of the second Bluetooth device; and after the electronic device disconnects from the second Bluetooth device, if the electronic device scans and obtains the broadcast of the second Bluetooth device, triggering the connection operation between the electronic device and the second Bluetooth device again.

9. The Bluetooth device pairing connection method according to claim 1, after the scanning and obtaining, by the electronic device, a broadcast meeting the filtering condition, and triggering a connection operation between the electronic device and a second Bluetooth device, further comprising:

if the electronic device scans and obtains a broadcast that meets the filtering condition and that is sent by another second Bluetooth device, triggering a connection operation between the electronic device and the another second Bluetooth device, wherein the broadcast sent by the another second Bluetooth device is generated by the another second Bluetooth device after the second Bluetooth device obtains the Bluetooth address of the electronic device and sends the Bluetooth address of the electronic device to the another second Bluetooth device communicatively connected to the second Bluetooth device.

10. The Bluetooth device pairing connection method according to claim 1, after the scanning and obtaining, by the electronic device, a broadcast meeting the filtering condition, and triggering a connection operation between the electronic device and a second Bluetooth device, further comprising:

when determining that there is a possibility of accessing the second Bluetooth device by other electronic devices, sending, by the electronic device, Bluetooth addresses of the other electronic devices to the second Bluetooth device, so that the second Bluetooth device sends corresponding broadcasts one by one based on a preset time and a preset sequence, and further each of the other electronic devices triggers a connection operation between each of the other electronic devices and the second Bluetooth device.

11. The Bluetooth device pairing connection method according to claim 10, wherein the determining that there is a possibility of accessing the second Bluetooth device by other electronic devices comprises:

determining that there are the other electronic devices sharing a same account in cloud space or a network disk with the electronic device; or learning of the Bluetooth addresses of the other electronic devices in any communication mode.

12. An electronic device, comprising at least one processor and a memory, wherein the memory stores a computer program, and the computer program is executed by the at least one processor to perform the following:

establishing a connection to a first Bluetooth device, and sending a Bluetooth address of the electronic device to the first Bluetooth device in a process of establishing the connection;

performing scanning with a filtering condition, wherein the filtering condition is that data segment content of a broadcast comprises the Bluetooth address of the electronic device; and scanning and obtaining a broadcast meeting the filtering condition, and triggering a connection operation between the electronic device and a second Bluetooth device, wherein the broadcast comprising the Bluetooth address of the electronic device is generated by the second Bluetooth device after the first Bluetooth device sends the Bluetooth address of the electronic device to the second Bluetooth device that establishes a connection to the first Bluetooth device.

13. The electronic device according to claim 12, wherein if the first Bluetooth device is a Bluetooth device with classic Bluetooth, the Bluetooth address of the electronic device is a classic Bluetooth address of the electronic device; or if the first Bluetooth device is a Bluetooth low energy device, the Bluetooth address of the electronic device is an equivalent address of the electronic device.

14. The electronic device according to claim 12, wherein the performing scanning with a filtering condition comprises:

delivering a filter to a Bluetooth chip of the electronic device; and scanning whether each broadcast meets the filtering condition.

15. The electronic device according to claim 12, wherein the performing scanning with a filtering condition comprises:

delivering a filter to a Bluetooth chip of the electronic device when being in an enabled state; and scanning whether each broadcast meets the filtering condition.

16. The electronic device according to claim 12, wherein the scanning and obtaining a broadcast meeting the filtering condition, and triggering a connection operation between the electronic device and a second Bluetooth device comprises:

scanning and obtaining the broadcast meeting the filtering condition, and reporting, to a controller built-in service of the electronic device, a Bluetooth address of the second Bluetooth device comprised in the broadcast; and triggering the connection operation between the electronic device and the second Bluetooth device.

17. The electronic device according to claim 12, wherein the connection operation comprises a direct connection or a dialog box inquiry connection.

18. The electronic device according to claim 12, after the scanning and obtaining a broadcast meeting the filtering condition, and triggering a connection operation between the electronic device and a second Bluetooth device, further comprising:

determining whether the second Bluetooth device performs no operation or fails to be connected within a preset time period; and if a determining result is yes, breaking a connection between the electronic device and the second Bluetooth device.

19. The electronic device according to claim 12, after the scanning and obtaining a broadcast meeting the filtering condition, and triggering a connection operation between the electronic device and a second Bluetooth device, further comprising:

recording a Bluetooth address of the second Bluetooth device; and after the electronic device disconnects from the second Bluetooth device, if the electronic device scans and obtains the broadcast of the second Bluetooth device, triggering the connection operation between the electronic device and the second Bluetooth device again.

20. The electronic device according to claim 12, after the scanning and obtaining a broadcast meeting the filtering condition, and triggering a connection operation between the electronic device and a second Bluetooth device, further comprising:

if the electronic device scans and obtains a broadcast that meets the filtering condition and that is sent by another second Bluetooth device, triggering a connection operation between the electronic device and the another second Bluetooth device, wherein the broadcast sent by the another second Bluetooth device is generated by the another second Bluetooth device after the second Bluetooth device obtains the Bluetooth address of the electronic device and sends the Bluetooth address of the electronic device to the another second Bluetooth device communicatively connected to the second Bluetooth device.

* * * * *